United States Patent
Kamiyama et al.

(10) Patent No.: US 8,872,998 B2
(45) Date of Patent: Oct. 28, 2014

(54) IMAGE DISPLAY APPARATUS

(75) Inventors: Hiroshi Kamiyama, Osaka (JP); Tomohiko Okada, Osaka (JP); Tetsushi Ito, Osaka (JP); Takashi Nishida, Osaka (JP); Kenji Tanaka, Osaka (JP); Hirotoshi Iemura, Osaka (JP); Masakatsu Kusuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 361 days.

(21) Appl. No.: 13/042,763

(22) Filed: Mar. 8, 2011

(65) Prior Publication Data
US 2011/0221994 A1   Sep. 15, 2011

(30) Foreign Application Priority Data

Mar. 10, 2010 (JP) ................ P2010-053847
Jul. 30, 2010 (JP) ................ P2010-173072

(51) Int. Cl.
G02F 1/1335 (2006.01)
G02F 1/1333 (2006.01)

(52) U.S. Cl.
CPC ............... G02F 1/133608 (2013.01)
USPC ............................. 349/62; 349/60

(58) Field of Classification Search
USPC ..................................... 349/58–69
See application file for complete search history.

(56) References Cited

U.S. PATENT DOCUMENTS 6,175,396 B1  1/2001  Kim et al.
7,413,324 B2 *  8/2008  Chang .......................... 362/225

2005/0128173 A1  6/2005  Booh et al.
2009/0066874 A1  3/2009  Tsumura et al.
2010/0124046 A1  5/2010  Kuromizu
2010/0309106 A1  12/2010  Kuromizu

FOREIGN PATENT DOCUMENTS

| JP | 10-326517 | 12/1998 |
|---|---|---|
| JP | 11-281966 | 10/1999 |
| JP | 2000-171773 | 6/2000 |
| JP | 2001-227494 | 8/2001 |
| JP | 2004-233828 | 8/2004 |
| JP | 2005-017555 | 1/2005 |
| JP | 2005-182019 | 7/2005 |
| JP | 2007-033962 | 2/2007 |
| JP | 2007-086649 | 4/2007 |
| JP | 2009-63903 | 3/2009 |
| JP | 2009-122368 | 6/2009 |
| JP | 2009-238398 | 10/2009 |
| WO | WO 2008/129724 A1 | 10/2008 |
| WO | WO 2009/107459 A1 | 9/2009 |

* cited by examiner

Primary Examiner — Dung Nguyen
(74) Attorney, Agent, or Firm — Nixon & Vanderhye P.C.

(57) ABSTRACT

In an image display apparatus, a protruding portion is fixed to a chassis on a back side Z2 of a planar member and protrudes towards the planar member. The protruding portion has one or more first protruding members and one or more second protruding members and defines a small allowance region and a large allowance region for the planar member. In the small allowance region, an amount of displacement of the planar member towards the chassis side is regulated at most to a first predetermined value by the one or more first protruding members. In the large allowance region, an amount of displacement of the planar member towards the chassis side is regulated at most to a second predetermined value larger than the first predetermined value by the one or more second protruding member.

9 Claims, 19 Drawing Sheets

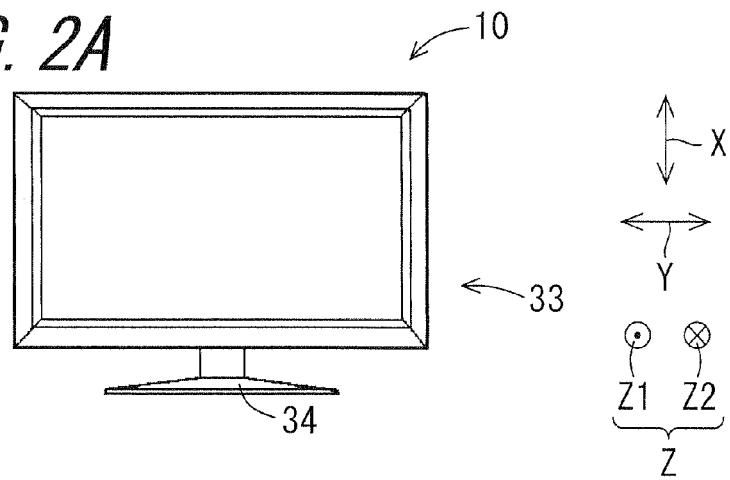
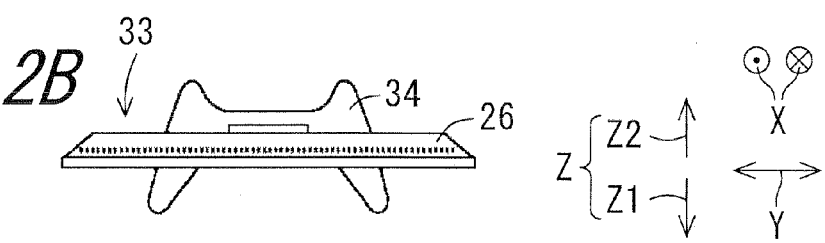
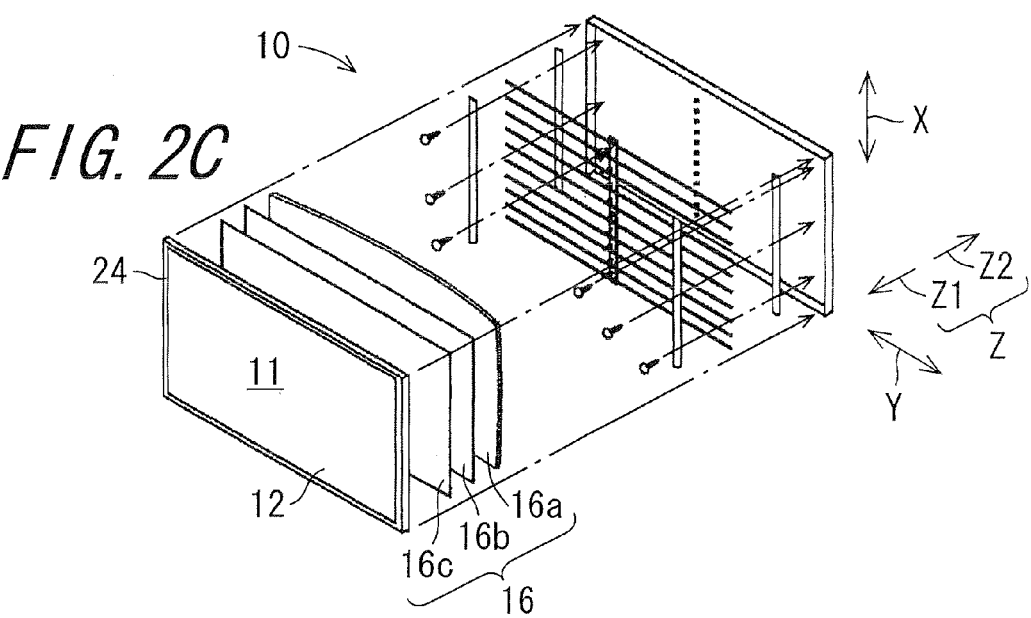

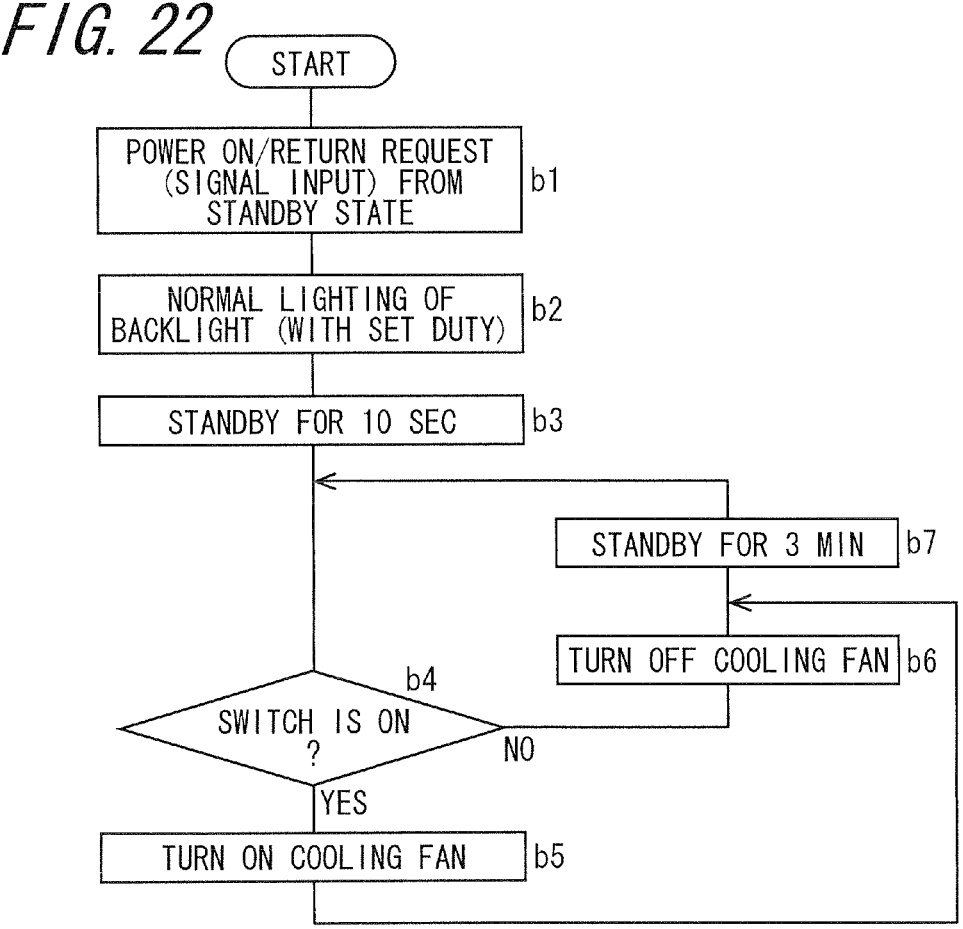

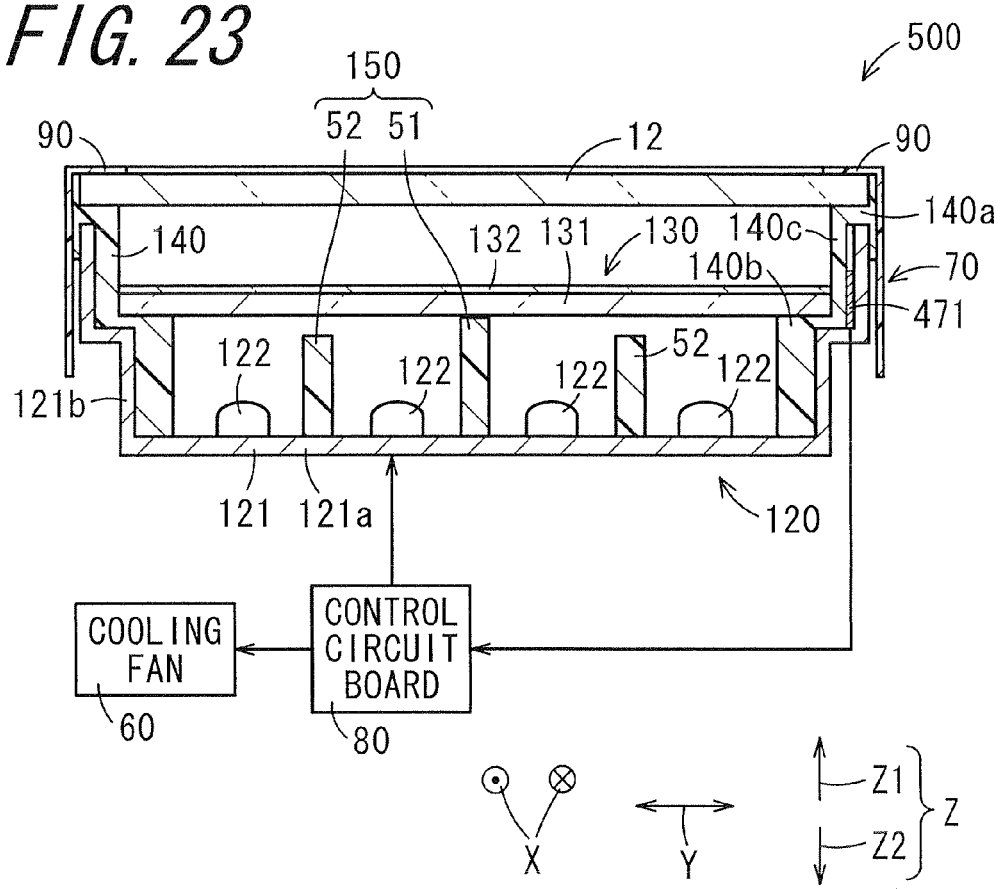

IMAGE DISPLAY APPARATUS

CROSS-REFERENCE TO RELATED APPLICATION

This application claims priority to Japanese Patent Application No. 2010-053847, which was filed on Mar. 10, 2010, and Japanese Patent Application No. 2010-173072, which was filed on Jul. 30, 2010, the contents of which are incorporated herein by reference in their entirety.

BACKGROUND OF THE TECHNOLOGY

1. Field of the Technology

The present technology relates to an image display apparatus in which a display screen for displaying images is formed. In addition, the present technology relates to an image display apparatus in which a planar optical member is arranged between a liquid crystal panel and an illumination light source illuminating the liquid crystal panel, and more particularly, to an image display apparatus capable of efficiently suppressing thermal deformation of the optical member.

2. Description of the Related Art

Japanese Unexamined Patent Publication JP-A 10-326517 (1998) discloses an image display apparatus having a backside illumination unit which includes a sheet-shaped optical member, a lamp housing, and a plurality of spacer pins. The plurality of spacer pins are arranged on the bottom inner portion of the lamp housing so as to prevent the central portion of the optical member from being bent towards the bottom inner portion of the lamp housing. The optical member extends in a planar direction thereof due to thermal expansion resulting from a temperature rise. The linear expansion coefficient of the optical member is larger than those of the other members.

When a bezel, which covers the optical member, is configured such as to be a part of the lamp housing, or to connect to the lamp housing, and is provided to be sufficiently larger than the optical member outwardly in the planar direction thereof, the amount of extension of the optical member resulting from the thermal expansion of the optical member can be accommodated in an inner space of the bezel.

In recent years, there has been an increasing demand for image display apparatuses having a larger display screen and a small thickness. In such image display apparatuses, it is desirable to further decrease the size of the bezel provided outwardly in the planar direction of the display screen, and a narrower bezel is demanded.

Japanese Unexamined Patent Publication JP-A 2004-233828 discloses a liquid crystal display apparatus which includes a lamp housing, a light diffuser plate, a front sheet, a liquid crystal panel, and a plurality of lines of pillars. The plurality of lines of pillars are formed at positions where they support a central portion of the light diffuser plate provided above the pillars and the surrounding portion of the central portion. Among the plurality of lines of pillars, the length of the pillars supporting the central portion is larger than the length of the pillars supporting the surrounding portion.

The technique of realizing a narrower bezel as disclosed in JP-A 10-326517 has a problem in that extension of the optical member resulting from thermal expansion or the like cannot be allowed.

The technique disclosed in JP-A 2004-233828 has a problem in that although bending can be allowed and the bending direction can be regulated, the central portion of the light diffuser plate comes into contact with the liquid crystal panel.

In addition, techniques concerning temperature control performed in an image display apparatus are disclosed in Japanese Unexamined Patent Publications JP-A 2000-171773, JP-A 2001-227494 and JP-A 2005-17555.

JP-A 2000-171773 discloses a liquid crystal display apparatus which includes a liquid crystal panel, an illumination unit including a fluorescent tube which is an illumination light source, a temperature sensor that detects an ambient temperature of the fluorescent tube, an optical sensor that detects a luminance on the surface of the liquid crystal panel, a cooling unit for cooling down the illumination unit, and a control circuit for controlling the cooling unit in accordance with the detection results from the optical sensor and the temperature sensor. The liquid crystal display apparatus is capable of maintaining the maximum luminance by controlling the ambient temperature of the fluorescent tube.

JP-A 2001-227494 discloses a display apparatus which uses a PDP (Plasma Display Panel) and which includes a cooling fan for cooling down a casing of the display apparatus, an outside-air temperature detection section that detects the outside-air temperature of the display apparatus, a determining section that determines the rotation speed of the cooling fan corresponding to the detected outside-air temperature, and a fan control unit that gradually increases the rotation speed of the cooling fan from a non-rotating state to the rotation speed determined by the determining section within a predetermined period. The display apparatus diminishes discomfort resulting from the rotation sound of the fan.

JP-A 2005-17555 discloses a display apparatus which includes an approximately box-shaped main body, a liquid crystal panel and a backlight disposed on a front side of the main body, a control unit disposed on a rear side of the main body, and a first temperature sensor for detecting the temperature of the control unit. When the first temperature sensor detects a temperature equal to or higher than a first setting value, the control unit decreases the power inputted to the backlight. Thus, it is possible to decrease the temperature of the control unit to a temperature lower than the first setting value.

In recent years, liquid crystal display apparatuses have been increased in size and luminance as well as narrowed in bezel size. In such liquid crystal display apparatuses, there is a problem in that a planar optical member arranged between a liquid crystal panel and an illumination light source illuminating the liquid crystal panel is thermally deformed to an unallowable extent accompanied by heat generation of the illumination light source, whereby the quality of images displayed on the liquid crystal panel deteriorates.

However, none of the display apparatuses disclosed in JP-A 2000-171773, JP-A 2001-227494, and JP-A 2005-17555 are configured to perform temperature control focusing on the thermal deformation of the optical member. Therefore, there is a problem in that deterioration of the image quality due to the thermal deformation of the optical member is not suppressed efficiently, and thus, noise produced by the cooling unit is not decreased.

Moreover, the display apparatuses disclosed in JP-A 2000-171773, JP-A 2001-227494, and JP-A 2005-17555 are configured to control only one of the cooling unit and the illumination light source. Therefore, there is a problem in that the control is not performed with high efficiency or high accuracy.

SUMMARY OF THE TECHNOLOGY

An object of the technology is to provide an image display apparatus capable of allowing extension of a planar member, which is a diffuser plate or a reinforcing plate, even when there is a limit to the dimensions of a bezel in the planar direction of a display screen.

Another object of the technology is to provide an image display apparatus capable of efficiently suppressing thermal deformation of a planar optical member arranged between a liquid crystal panel and an illumination light source illuminating the liquid crystal panel.

The technology provides an image display apparatus comprising:

a liquid crystal panel having liquid crystal elements, for displaying an image on one surface thereof using the liquid crystal elements;

a chassis disposed on a side of another surface of the liquid crystal panel;

a planar member disposed between the liquid crystal panel and the chassis so as to be approximately in parallel to the liquid crystal panel, the planar member being a diffuser plate or a reinforcing plate; and a protruding portion fixed to the chassis and protruding towards the planar member, the protruding portion including:

one or more first protruding members disposed so as to be separated by a first distance from the liquid crystal panel, the one or more first protruding members defining a small allowance region for the planar member in which an amount of displacement of the planar member towards the chassis side is regulated at most to a first predetermined value; and one or more second protruding members disposed so as to be separated by a second distance which is larger than the first distance, from the liquid crystal panel, the one or more second protruding members defining a large allowance region for the planar member in which an amount of displacement towards the chassis side is regulated at most to a second predetermined value which is larger than a first predetermined value.

The protruding portion is fixed to the chassis so as to protrude towards the planar member. Moreover, the protruding portion includes the one or more first protruding members and the one or more second protruding members and defines the small allowance region and the large allowance region for the planar member. In the small allowance region, the amount of displacement of the planar member towards the chassis side is regulated at most to the first predetermined value by the one or more first protruding members. In the large allowance region, the amount of displacement of the planar member towards the chassis side of the planar member is regulated at most to the second predetermined value larger than the first predetermined value, by the one or more second protruding members.

With this configuration, when the planar member is expanded due to a temperature rise, for example, it is possible to allow displacement of the planar member in the thickness direction in the large allowance region. Therefore, it is possible to suppress the advancing amount of the planar member advancing outwardly in the planar direction thereof. Moreover, it is possible to control the amount of displacement in the thickness direction of the planar member at different positions in the planar direction of the planar member using the one or more first and second protruding members. Therefore, even when the advancing amount of the planar member outwardly in the planar direction thereof is limited to a small value, it is possible to limit the amount of displacement in the thickness direction due to bending of the planar member.

Furthermore, it is preferable that at least the one or more second protruding members of the protruding portion are provided so as to be separated from the planar member at room temperature, and the one or more first and second protruding members regulate the amount of displacement towards the chassis side when the temperature of the planar member reaches a temperature higher than room temperature.

At least the one or more second protruding members the protruding portion are disposed so as to be separated from the planar member at room temperature, and the one or more first and second protruding members regulate the amount of displacement towards the chassis side when the temperature of the planar member reaches a temperature higher than room temperature. With this configuration, it is possible to limit the maximum amount of displacement while allowing the displacement towards the chassis side. Therefore, it is possible to prevent the function of the planar member from being impaired by the bending due to a temperature rise.

Furthermore, it is preferable that the large allowance region is defined at different positions which are separated on opposite sides to each other with respect to a center of the planar member.

The large allowance region is defined at different positions which are separated on opposite sides to each other with respect to a center of the planar member. With this configuration, it is possible to define a plurality of large allowance regions separated in the planar direction of the planar member. Therefore, it is possible to allow the amount of displacement in the thickness direction of the planar member at plurality of positions of the planar member. With this configuration, as compared to the case where the large allowance region is defined at one position, it is possible to suppress the advancing amount of the planar member advancing outwardly in the planar direction thereof and allow larger expansion of the planar member. Moreover, as compared to the case where the large allowance region is defined at one position, it is possible to decrease the amount of displacement in the thickness direction due to the bending of the planar member with respect to a predetermined amount of expansion of the planar member.

Furthermore, it is preferable that a plurality of large and small allowance regions are defined in a predetermined first direction of the planar direction extending along the liquid crystal panel and a predetermined second direction crossing the first direction of the planar direction extending along the liquid crystal panel.

A plurality of large and small allowance regions are defined in a predetermined first direction of the planar direction extending along the liquid crystal panel and a predetermined second direction crossing the first direction of the planar direction extending along the liquid crystal panel. With this configuration, it is possible to suppress the advancing amount of the planar member advancing outwardly in any planar directions thereof extending along the liquid crystal panel.

Furthermore, it is preferable that the large allowance region is defined in an annular form with respect to the center of the planar member.

The large allowance region is defined in an annular form with respect to the center of the planar member. With this configuration, it is possible to define a plurality of large allowance regions on any straight line parallel to the planar direction passing the center of the planar member. Therefore, as compared to the case where one large allowance region is defined in at least one direction of the planar direction, it is possible to suppress the advancing amount of the planar member advancing outwardly in any planar directions thereof extending along the liquid crystal panel.

Furthermore, it is preferable that a notch is formed in a part of the small allowance region in an outer peripheral portion of the planar member or in a part of the outer peripheral portion in a vicinity of the small allowance region.

A notch is formed in a part of the small allowance region in an outer peripheral portion of the planar member or in a part of the outer peripheral portion in the vicinity of the small allowance region. With this configuration, it is possible to decrease bending rigidity of the planar member in a vicinity of the notch. Therefore, it is possible to allow bending of the planar member on a straight line passing the notch. In this way, it is possible to allow displacement in the thickness direction, of other regions except in the vicinity of the notch. Thus, it is possible to make displacement of the large allowance region in the thickness direction easier than in the small allowance region.

Furthermore, it is preferable that a convex portion protruding outwardly in a planar direction of the planar member is formed in a part of the small allowance region in an outer peripheral portion of the planar member or a part of the outer peripheral portion in a vicinity of the small allowance region, and the image display apparatus further comprises a spacer disposed between the convex portion and the liquid crystal panel.

A convex portion protruding outwardly in the planar direction of the planar member is formed in a part of the small allowance region in an outer peripheral portion of the planar member or a part of the outer peripheral portion in a vicinity of the small allowance region. The image display apparatus further includes a spacer which is disposed between the convex portion and the liquid crystal panel. With this configuration, it is possible to prevent a portion of the planar member in the vicinity of the convex portion from being displaced in the thickness direction. Therefore, it is possible to determine the position of a portion where the displacement of the planar member in the thickness direction is allowed and a portion where the displacement of the planar member in the thickness direction is regulated.

Furthermore, it is preferable that a minimum value of a thickness dimension of the planar member in the small allowance region is set to be smaller than a thickness dimension of the planar member in the large allowance region.

A minimum value of a thickness dimension of the planar member in the small allowance region is set to be smaller than a thickness dimension of the planar member in the large allowance region. With this configuration, it is possible to decrease bending rigidity of the planar member in the small allowance region. Therefore, it is possible to allow displacement in the thickness direction, of other regions except the small allowance region. Thus, it is possible to make displacement of the large allowance region in the thickness direction easier than in the small allowance region.

Furthermore, it is preferable that the liquid crystal panel is formed in a rectangular form, and the large allowance regions are defined in a plurality of lines in a short-side direction of the liquid crystal panel.

The liquid crystal panel is formed in a rectangular form, and the large allowance regions are defined in a plurality of lines in a short-side direction of the liquid crystal panel. With this configuration, even when the planar member is expanded, it is possible to decrease the advancing amount of the planar member advancing outwardly in the planar direction thereof in a long-side direction of the liquid crystal panel. When the linear expansion coefficient of the planar member is the same in both the long-side direction and the short-side direction, the amount of extension in the long-side direction is larger than the amount of extension in the short-side direction. Therefore, by decreasing the advancing amount of the planar member advancing outwardly in the planar direction thereof in the long-side direction, it is possible to decrease the maximum value of the advancing amount of the planar member advancing outwardly in the planar direction thereof.

The technology also provides an image display apparatus comprising:

a liquid crystal panel capable of displaying images;

an illumination unit having an illumination light source that is disposed on a back side of the liquid crystal panel, illuminating the liquid crystal panel;

a planar member disposed between the liquid crystal panel and the illumination light source, the planar member being a diffuser plate or a reinforcing plate;

a supporting portion for supporting a peripheral portion of the planar member so that the planar member is parallel or approximately parallel to the liquid crystal panel;

a cooling unit for cooling down the illumination unit;

a deformation amount detection element for detecting an amount of extension of the planar member in a planar direction thereof or an amount of bending of the planar member towards the back side; and a control unit for controlling driving of the illumination light source and/or the cooling unit based on detection results outputted from the deformation amount detection element so that the amount of extension or the amount of bending decreases.

Since the driving of the cooling unit is controlled by detecting the deformation amount of the planar member, it is possible to efficiently prevent deterioration of image quality resulting from a temperature rise in the image display apparatus and to decrease noise resulting from the driving of the cooling unit as much as possible, thus creating a quiet condition. Moreover, since the deformation amount of the planar member is efficiently detected from an initial stage where the deformation amount of the planar member is relatively small, it is possible to control the driving of the cooling unit and/or the lighting of the illumination light source on a safe side where image quality deterioration resulting from a temperature rise in the image display apparatus has not occurred or progressed.

Furthermore, it is preferable that the deformation amount detection element includes:

a displacement member provided so as to be supported at a predetermined initial position on the back side of the planar member and to be displaceable in a direction towards or away from the planar member; and a displacement amount detection section for detecting an amount of displacement of the displacement member from the initial position, and the control unit controls driving of the illumination unit and/or the cooling unit based on the detection results outputted from the displacement amount detection section so that the displacement member returns to the initial position.

Furthermore, it is preferable that the displacement amount detection section includes an optical detection section for optically detecting the amount of displacement of the displacement member from the initial position.

Furthermore, it is preferable that the deformation amount detection element further includes a deformation member that is deformed in accordance with the amount of displacement of the displacement member from the initial position, and the displacement amount detection section includes a strain detection section for detecting an amount of strain of the deformation member.

Furthermore, it is preferable that the deformation amount detection element includes a distance measurement section which is provided at a position separated from the planar member on the back side of the planar member, for detecting a distance to the planar member in a non-contacting manner, and the control unit controls driving of the illumination unit and/or the cooling unit based on determination results outputted from the distance measurement section so that the distance to the planar member is larger than a predetermined distance.

Furthermore, it is preferable that the deformation amount detection element includes:

a displacement member which is provided on the back side of the planar member so as to be displaceable in a direction towards or away from the planar member; and a switch element capable of switching between a conduction state and a cut-off state in accordance with a displacement of the displacement member, and the control unit controls driving of the illumination unit and/or the cooling unit based on a state of the switch element so that the displacement member returns to the initial position.

Furthermore, it is preferable that the deformation amount detection element includes a switch element which is provided outwardly in the planar direction of the planar member so as to be capable of switching between conduction state and a cut-off state in accordance with extension of the planar member in the planar direction thereof, and the control unit controls driving of the illumination unit and/or the cooling unit based on a state of the switch element so that the extension of the planar member in the planar direction thereof decreases.

BRIEF DESCRIPTION OF THE DRAWINGS

Other and further objects, features, and advantages of the technology will be more explicit from the following detailed description taken with reference to the drawings wherein:

FIGS. 2A to 2C are diagrams showing an external appearance and configuration of the image display apparatus according to the first embodiment of the technology;

FIG. 22 is a flowchart of a driving control in the liquid crystal display apparatus according to the eleventh embodiment of the technology; and FIG. 23 is a cross-sectional view showing a schematic configuration of a liquid crystal display apparatus according to a twelfth embodiment of the technology.

DETAILED DESCRIPTION

Figure 1:
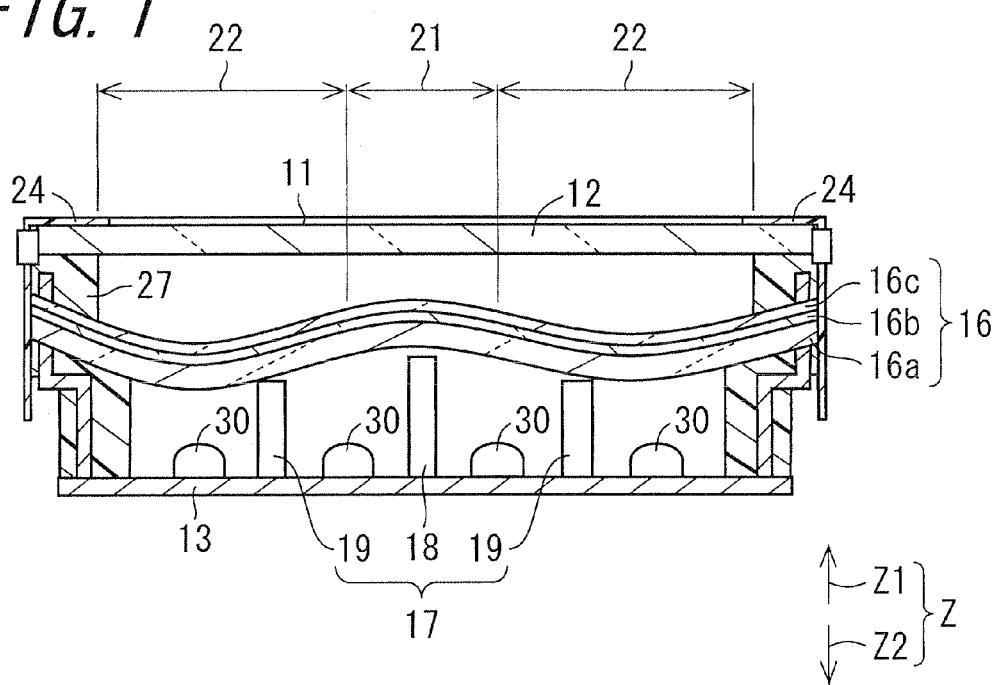
FIG. 1 is a cross-sectional view of an image display apparatus according to a first embodiment of the technology.

Now referring to the drawings, preferred embodiments of the technology are described below.

Hereinafter, a plurality of embodiments of the technology will be described with reference to the drawings. In the description of a second embodiment and the subsequent embodiments, redundant description of the portions corresponding to those which have already been described in the preceding embodiments may be omitted. When only some configurations are described, the other configurations can be considered the same as those described in the preceding embodiments. The portions described in detail in the respective embodiments can be combined with each other, and the embodiments may be partially combined with each other unless combination thereof is difficult. Each embodiment is illustrated to represent the techniques relating to the technology but is not intended to limit the technical scope of the technology. The technical content relating to the technology may be modified in various ways within the technical scope described in the claims.

(First Embodiment)

FIG. 1 is a cross-sectional view of an image display apparatus 10 according to a first embodiment of the technology. FIGS. 2A to 2C are diagrams showing an external appearance and configuration of an image display apparatus 10 according to the first embodiment of the technology. FIG. 2A is a front view of an image display apparatus 10, FIG. 2B is a plan view of the image display apparatus 10, and FIG. 2C is an exploded perspective view of the image display apparatus 10. The image display apparatus 10 according to the first embodiment has a display screen 11 that displays images thereon, and images are displayed on the display screen 11. In the image display apparatus 10, a frame-shaped bezel 24 surrounding a periphery of a liquid crystal panel 12 from an outer side in a planar direction thereof is narrowed.

The image display apparatus 10 is a liquid crystal display apparatus which includes the liquid crystal panel 12, a chassis 13, a planar member 16, and a protruding portion 17. The liquid crystal panel 12 is a panel which has liquid crystal elements and which displays images on one surface side using the liquid crystal elements. The one surface is a display screen, and the one surface side is a front side. The chassis 13 is disposed on a side of another surface, namely a back side Z2, of the liquid crystal panel 12. The planar member 16 is disposed between the liquid crystal panel 12 and the chassis 13 approximately in parallel to the liquid crystal panel 12. The protruding portion 17 is provided on the back side Z2 of the planar member 16 and fixed to the chassis 13 and protrudes towards the planar member 16. In FIG. 2C, the image display apparatus 10 is illustrated with the protruding portion 17 and the light source 30 graphically omitted. A sheet-shaped component 16 disposed approximately in parallel to the liquid crystal panel 12 between the liquid crystal panel 12 and the chassis 13 is a planar member which is a diffuser plate or a reinforcing plate. In the first embodiment, the planar member 16 is a sheet-shaped component which is formed in a sheet form and an integrated form by one or more members.

The protruding portion 17 has one or more first protruding members 18 and one or more second protruding members 19 and define a small allowance region 21 and a large allowance region 22 for the planar member 16. The one or more first protruding members 18 are disposed so as to be separated by a first distance from the liquid crystal panel 12. The one or more second protruding member 19 are disposed so as to be separated by a second distance which is larger than the first distance, from the liquid crystal panel 12. In the small allowance region 21, the amount of displacement of the planar member 16 towards the back side Z2 (chassis 13 side) is regulated to a first predetermined value at most by the one or more first protruding members 18. In the large allowance region 22, the amount of displacement of the planar member 16 towards the back side Z2 (chassis 13 side) is regulated to a second predetermined value larger than the first predetermined value at most by the one or more second protruding members 19.

At least the one or more second protruding members 19 of the protruding portion 17 are disposed so as to be separated from the planar member 16 at room temperature, and the one or more first and second protruding members 18 and 19 regulate the amount of displacement of the planar member 16 towards the back side Z2 (chassis 13 side) when the temperature of the planar member 16 reaches a temperature higher than room temperature. The large allowance region 22 is defined at different positions which are separated on opposite sides to each other with respect to a center of the planar member 16. A plurality of large and small allowance regions 22 and 21 are defined in a predetermined first direction X of the planar direction extending along the liquid crystal panel 12 and a second direction Y crossing the first direction X of the planar direction extending along the liquid crystal panel 12. In FIGS. 2A to 2C, the first direction X is illustrated as the vertical direction of the planar direction, and the second direction Y is illustrated as the horizontal direction of the planar direction.

In the first embodiment, the image display apparatus 10 is an apparatus that displays images on the display screen 11 of a television or a personal computer or the like by outputting image information. The display screen 11 is formed by the liquid crystal panel 12 having liquid crystal elements, and the liquid crystal panel 12 is formed in a flat plate-like form. In the liquid crystal panel 12, the two directions of the thickness direction Z will be referred to as the front side Z1 and the back side Z2. The image display apparatus 10 displays images so as to be perceived when seen from the front side Z1. In the image display apparatus 10, as for the flat plate-shaped component disposed in parallel to the liquid crystal panel 12, the terms "front side Z1" and "back side Z2" will be used as meaning the same directions as used with reference to the liquid crystal panel 12.

The image display apparatus 10 includes a bezel 24. The bezel 24 forms a part of a casing that accommodates the planar member 16, the chassis 13, and the protruding portion 17. Although the casing may be formed to be entirely integrated with the bezel 24, in the first embodiment, the casing has the bezel 24 and a back-side member 26 which forms the casing together with the bezel 24. The bezel 24 is disposed so as to extend outwardly in the planar direction of the liquid crystal panel 12 as seen from the front side Z1. The bezel 24, solely or together with the back-side member 26, defines an inner space. In FIG. 1, the image display apparatus 10 is illustrated with the back-side member 26 graphically omitted. When the image display apparatus 10 is seen from the front side Z1, the bezel 24 and the liquid crystal panel 12 are formed in a rectangular form. Although the rectangle may be disposed to be vertically long or horizontally long in a normal posture when the image display apparatus 10 displays images, in the first embodiment, the rectangle is disposed to be horizontally long.

The outer peripheral portion of the liquid crystal panel 12 is accommodated in the inner space of the bezel 24 along the entire outer peripheral portion of the rectangle. The bezel 24 has a pair of long-side portions that forms the long sides of the rectangle and a pair of short-side portions that forms the short sides of the rectangle. The long-side direction and the short-side direction of the rectangle formed by the bezel 24 are parallel to the planar direction of the liquid crystal panel 12 and are perpendicular to each other. The shape, material, and size of the long-side portion and the short-side portion are uniformly formed in the long-side direction and the short-side direction. Although the dimension of the long-side portion in the short-side direction, namely the width dimension of the long-side portion, and the dimension of the short-side portion in the long-side direction, namely the width dimension of the short-side portion may be formed in different dimensions, in the first embodiment, the two dimensions are formed to the same dimension.

The liquid crystal panel 12 and the planar member 16 are disposed in parallel to each other and are formed in a rectangular form as seen from the thickness direction Z so that the long-side direction of each of the two members is identical to the long-side direction of the bezel 24. Therefore, the liquid crystal panel 12 and the planar member 16 are disposed so that the short-side direction of each of the two members is identical to the short-side direction of the bezel 24. The planar member 16 is disposed on the back side Z2 (chassis 13 side) of the liquid crystal panel 12 so that the center of the planar member 16 as seen from the thickness direction Z is identical to the center of the liquid crystal panel 12 as seen from the thickness direction Z.

A spacer 27 is provided between the outer peripheral portion in the planar direction of the liquid crystal panel 12 and the outer peripheral portion in the planar direction of the planar member 16. The liquid crystal panel 12 and the planar member 16 are relatively positioned by the spacer 27 so as to be separated from each other by a predetermined distance in the thickness direction Z. The spacer 27 is disposed so as to be in contact with the entire outer peripheral portion in the planar direction of the liquid crystal panel 12. Moreover, although the spacer 27 may be disposed so as to be in contact with a part of the outer peripheral portion in the planar direction of the planar member 16, in the first embodiment, the spacer 27 is disposed so as to be in contact with the entire outer peripheral portion in the planar direction of the planar member 16. Although the size of the image display apparatus 10 is not particularly limited, in the first embodiment, the image display apparatus 10 is a liquid crystal display apparatus in which the diagonal line of the liquid crystal panel 12 is 60 inches and the aspect ratio is 16:9. In this case, the distance between the liquid crystal panel 12 and the planar member 16 is set to be equal to or larger than 0.5 mm and equal to or smaller than 10 mm, for example, by the spacer 27.

The image display apparatus 10 further includes a light source 30, and the light source 30 is disposed on the back side Z2 of the planar member 16. A plurality of light sources 30 are disposed so as to emit light towards the liquid crystal panel 12 through the planar member 16 from the back side Z2. The light emitted from the light sources 30 is diffused in the planar direction by the planar member 16, and the light having passed through the planar member 16 enters the liquid crystal panel 12, whereby illumination light necessary for displaying images is supplied to the liquid crystal panel 12. A diffuser plate is referred to as a light guide plate and is also referred to as a light diffuser plate. Since the planar member 16 is disposed, even when the distances from the respective light sources 30 to the respective positions of the liquid crystal panel 12 are different, the luminance at the respective positions of the liquid crystal panel 12 will not be changed with the distances from the respective light sources 30. Therefore, the planar member 16 prevents the occurrence of luminance unevenness in the liquid crystal panel 12.

The planar member 16 is formed of a material which is uniform in at least the planar direction. Moreover, although the planar member 16 may be formed of an entirely uniform material, in the first embodiment, the planar member 16 includes a plurality of layers (16a, 16b, and 16c) which are formed of a plurality of materials and are arranged in the thickness direction Z. The plurality of layers of the planar member 16 are formed of materials having approximately the same linear expansion coefficients, and the difference of these linear expansion coefficients is negligible in relation to the difference of the linear expansion coefficients of other members such as the bezel 24.

The plurality of light sources 30 are mounted on the chassis 13, and the chassis 13 is fixed to the liquid crystal panel 12 with the position aligned thereto. In this way, the plurality of light sources 30 are fixed and arranged on the liquid crystal panel 12. Although the chassis 13 may be formed to be integrated with the back-side member 26, in the first embodiment, the chassis 13 is mounted on the back-side member 26 so as to hold the protruding portion 17 and the plurality of light sources 30. The chassis 13 holds at least the protruding portion 17 with the positions aligned to the liquid crystal panel 12, the planar member 16, the bezel 24, and the back-side member 26, and in the first embodiment, the chassis 13 also holds the plurality of light sources 30.

In this way, the liquid crystal panel 12, the planar member 16, the bezel 24, the back-side member 26, the spacer 27, the chassis 13, the protruding portion 17, and the plurality of light sources 30 are integrally formed. A structure formed by these members is sometimes referred to as a "display apparatus main body 33". The thickness direction Z of the liquid crystal panel 12 is approximately horizontally oriented in a normal posture when the image display apparatus 10 displays images. In other words, the display apparatus main body 33 is configured so that the planar direction of the liquid crystal panel 12 is approximately vertically oriented. Here, the term approximately horizontal includes horizontal and the term approximately vertical includes vertical. Moreover, the display apparatus main body 33 may be formed so that the posture thereof can be tilted within a predetermined angle range.

The image display apparatus 10 further includes a support stand 34 that supports the display apparatus main body 33. The support stand 34 is formed under the assumption that the image display apparatus 10 is placed on a horizontal mounting surface such as a floor surface. Although the support stand 34 may be formed to be fixed to the display apparatus main body 33, in the first embodiment, the support stand 34 is formed so as to be angularly displaceable with respect to the display apparatus main body 33 within a range where it can support the display apparatus main body 33. The angular displacement may be angular displacement around the vertical axial line and may be angular displacement around the horizontal axial line.

The image display apparatus 10 is used at the room temperature, and a temperature range where the image display apparatus 10 is assumed to be frequently used in the living environment of the user is determined in advance as the temperature range of the environment where the image display apparatus 10 is assumed to be used. This temperature range will be referred to as an "environmental temperature". The environmental temperature is determined under the assumption that the user usually lives indoors at room temperature, and the image display apparatus 10 and the respective components included therein are designed and manufactured in conformity with the environmental temperature.

The image display apparatus 10 is externally supplied with power and operates by the power used as a drive power. Moreover, the image display apparatus 10 receives signals representing image information and displays images based on the input image information. The image display apparatus 10 may be configured so as to perform fine adjustment on the input image information in terms of brightness, contrast, tint, and the like. When the image display apparatus 10 operates, the temperature of the air and respective members in the inner space defined by the back side Z2 of the liquid crystal panel 12, the bezel 24 and the back-side member 26 increases. The image display apparatus 10 is formed using one or more materials of a resin, a metal, wood, and the like.

In the display apparatus main body 33, the linear expansion coefficient relating to a temperature rise of the planar member 16 is larger than the linear expansion coefficients of the liquid crystal panel 12, the spacer 27, and the chassis 13. The planar member 16 is formed of a resin, and the linear expansion coefficient of the planar member 16 is $70 \times 10^{-6}/°$ C., for example. In contrast, when a metal is used for the bezel 24, the linear expansion coefficient of the bezel 24 is $11 \times 10^{-6}/°$ C. to $12 \times 10^{-6}/°$ C., for example.

Since the light sources 30 lie immediately below the planar member 16 and heat generated by a light source portion is easy to be transmitted thereto, the temperature of the planar member 16 is likely to increase as compared to the other components in the display apparatus main body 33. Therefore, the temperature of the planar member 16 increases with the operation of the image display apparatus 10, and the planar member 16 extends. The amount of extension of the planar member 16 is larger than the amount of extension of the other members occurring during the operation.

For example, in the case of the 60-inch image display apparatus 10, an image display region of the liquid crystal panel 12 is approximately 133 cm in the long-side dimension and approximately 75 cm in the short-side dimension. When, at the room temperature, in the inner space of the bezel 24, the gap between the planar member 16 and the bezel 24 or a peripheral member is set to 0 mm in both the long-side direction and the short-side direction, in the case of the 60-inch image display apparatus 10, the long-side dimension of the planar member 16 exhibits an amount of extension of 4.7 mm under a temperature difference of 50° C. Under the conditions of the same temperature difference of 50° C., the amount of extension of the bezel 24 or the peripheral member in the long-side direction is 0.8 mm. Therefore, the planar member 16 undergoes a surplus amount of extension of 3.9 mm as compared to the bezel 24 or the peripheral member. If the planar member 16 is bent so as to form an arc in the thickness direction Z due to the surplus amount of extension, the maximum value of the amount of displacement of the planar member 16 in the thickness direction Z due to the bending amounts to 45 mm.

When the image display apparatus 10 is operated, the temperature of air and respective members increases earlier on the back side Z2 than on the front side Z1 of the planar member 16. Therefore, the thermal expansion of the planar member 16 occurs earlier on the back side Z2, and the planar member 16 is bent in a convex shape towards the back side Z2.

In the first embodiment, since the large allowance region 22 and the small allowance region 21 are formed in the planar member 16, the planar member 16 is allowed to be deformed in a wavy form, and the planar member 16 is allowed to extend in the planar direction. Among the respective regions formed in the planar member 16, the kinds of the large allowance region 22 and the small allowance region 21 are defined by the protruding portion 17. The protruding portion 17 is provided to be fixed to the chassis 13 and include a plurality of rod-shaped members. The respective rod-shaped members are provided so as to protrude from the chassis 13 towards the front side Z1 of the thickness direction, and are classified into two kinds by the length of each of the rod-shaped members, namely the dimension in the thickness direction Z. Among the two kinds of rod-shaped members having different lengths, the longer rod-shaped members are referred to as "first protruding members 18" and the shorter rod-shaped members are referred to as "second protruding members 19".

In the first embodiment, the distance between the light source 30 and the planar member 16 is 40 mm, and the lengths of the first protruding member 18 and the second protruding member 19 are 42 mm and 37 mm, respectively. The difference between the lengths of the first and second protruding members 18 and 19 is determined so as to correspond to the maximum value of the bending of the planar member 16 in the thickness direction Z within a range where the bending of the planar member 16 will not cause any problems in image display. In the first embodiment, the length of the second protruding member 19 is set to be 88% of the length of the first protruding member 18. The respective protruding members are formed of polycarbonate having high reflectivity, for example. In the first embodiment, the respective protruding members have a diameter of 2 to 3 mm and exhibit white color. The first protruding member 18 is formed to have a length such that it comes into contact with the planar member 16 at room temperature.

When the planar member 16 is seen from the thickness direction Z, a region disposed closer to the second protruding member 19 than the first protruding member 18 will be referred to as a "large allowance region 22" and a region disposed closer to the first protruding member 18 than the second protruding member 19 will be referred to as a "small allowance region 21". Since the small allowance region 21 is close to the longer first protruding members 18, the amount of displacement of the small allowance region 21 in the thickness direction Z when the planar member 16 is expanded and bent is limited by the first protruding member 18. In contrast, since the large allowance region 22 is close to the shorter second protruding members 19, the amount of displacement of the large allowance region 22 in the thickness direction Z when the planar member 16 is expanded and bent is allowed by the second protruding member 19.

The distance between the surface of the planar member 16 on the back side Z2 and the end of the first protruding member 18 on the front side Z1 at room temperature is set to a first predetermined value which is the amount of displacement of the planar member 16 in the small allowance region 21. The first predetermined value may be set to 0 mm, and may be set to any value equal to or larger than 0 mm and equal to or smaller than 20 mm. The distance between the surface of the planar member 16 on the back side Z2 and the end of the second protruding member 19 on the front side Z1 at room temperature is set to a second predetermined value which is the amount of displacement of the planar member 16 in the large allowance region 22. The second predetermined value is larger than the first predetermined value in the small allowance region 21. The second predetermined value may be set to 5 mm, and may be set to any value equal to or larger than 0.5 mm and equal to or smaller than 25 mm.

Figure 3:
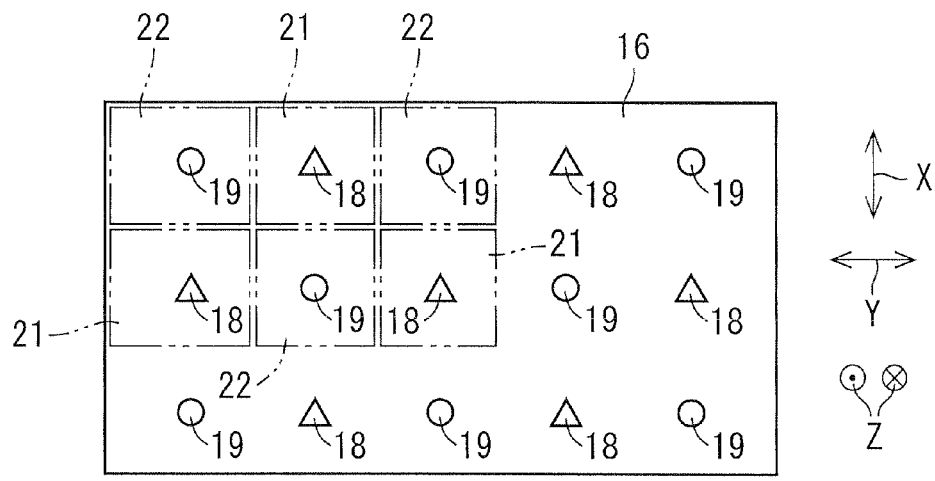
FIG. 3 is a view showing a planar member of the first embodiment of the technology and positions of first and second protruding members in the planar member.

FIG. 3 is a view showing the planar member 16 of the first embodiment of the technology and positions of the first and second protruding members 18 and 19 in the planar member 16. FIG. 3 is a view showing the distribution direction seen from the thickness direction Z, in which the positions of the first protruding members 18 are depicted by triangles and the positions of the second protruding members 19 are depicted by circles.

In the first embodiment, the first and second protruding members 18 and 19 are disposed in a line along a first direction X parallel to the planar direction and a second direction Y parallel to the planar direction and crossing the first direction X. In the first embodiment, the first direction X is the short-side direction, and the second direction Y is the long-side direction. Therefore, the first direction X and the second direction Y are orthogonal to each other. The plurality of rod-shaped members forming the protruding portion 17 are arranged in a plurality of lines in both the first and second directions X and Y, so that the first and second protruding members 18 and 19 are disposed at positions where they form grid points as seen from the thickness direction Z. The first and second protruding members 18 and 19 forming lines in the first and second directions X and Y are alternately arranged in any line of the first direction X or the second direction Y.

With this configuration, a plurality of large allowance regions 22 are defined for the planar member 16 at a plurality of different positions in the planar direction with the small allowance region 21 interposed therebetween in both the first and second directions X and Y. Therefore, as compared to the case where the planar member 16 is bent generally in one convex shape in the first or second direction X or Y, it is possible to decrease the amount of displacement in the thickness direction Z with respect to the same amount of extension.

In this way, even when the advancing amount advancing outwardly in the planar direction thereof is suppressed, it is possible to suppress deterioration of the image quality due to extension of the planar member 16. In other words, it is possible to increase the allowable amount of extension of the planar member 16.

According to the first embodiment, the protruding portion 17 is provided to be fixed to the chassis 13 on the back side Z2 of the planar member 16 and protrudes towards the planar member 16. Moreover, the protruding portion 17 has the one or more first protruding members 18 and the one or more second protruding members 19, and defines the small allowance region 21 and the large allowance region 22 for the planar member 16. In the small allowance region 21, the amount of displacement of the planar member 16 towards the back side Z2 (chassis 13 side) is regulated to a first predetermined value at most by the one or more first protruding members 18. In the large allowance region 22, the amount of displacement of the planar member 16 towards the back side Z2 (chassis 13 side) is regulated to a second predetermined value larger than the first predetermined value at most by the one or more second protruding members 19.

With this configuration, when the planar member 16 is expanded due to a temperature rise, for example, it is possible to allow displacement of the planar member 16 in the thickness direction Z in the large allowance region 22. Therefore, it is possible to suppress advancing by the advancing amount of the planar member 16 advancing outwardly in the planar direction thereof. Moreover, it is possible to control the amount of displacement in the thickness direction Z of the planar member 16 at different positions in the planar direction using the one or more first and second protruding members 18 and 19. Therefore, even when the advancing amount of the planar member 16 advancing outwardly in the planar direction thereof is limited to a small value, it is possible to limit the amount of displacement in the thickness direction Z due to bending of the planar member 16.

When the planar member 16 is seen from the thickness direction Z and in parallel to the planar direction of the planar member 16, the direction facing away from a position included in the plane of the rectangle of the planar member 16 at room temperature to the outer side of the rectangle over the contour of the rectangle will be referred to as "outwardly in the planar direction".

According to the first embodiment, at least the one or more second protruding members 19 of the protruding portion 17 are disposed so as to be separated from the planar member 16 at room temperature, and the one or more first and second protruding members 18 and 19 regulate the amount of displacement of the planar member 16 towards the back side Z2 (chassis 13 side) when the temperature of the planar member 16 reaches a temperature higher than room temperature. With this configuration, it is possible to limit the maximum amount of displacement while allowing the displacement of the planar member 16 towards the back side Z2 (chassis 13 side). Therefore, it is possible to prevent the function of the planar member 16 from being impaired by the bending due to a temperature rise.

According to the first embodiment, the large allowance region 22 is defined at different positions which are separated on opposite sides to each other with respect to a center of the planar member 16. With this configuration, it is possible to define a plurality of large allowance regions 22 separated in the planar direction of the planar member 16. Therefore, it is possible to allow the amount of displacement in the thickness direction Z of the planar member 16 at a plurality of positions of the planar member 16. With this configuration, as compared to the case where the large allowance region 22 is defined at one position, it is possible to suppress the advancing by the advancing amount of the planar member 16 advancing outwardly in the planar direction thereof and allow larger expansion of the planar member 16. Moreover, as compared to the case where the large allowance region 22 is defined at one position, it is possible to decrease the amount of displacement in the thickness direction Z due to the bending of the planar member 16 with respect to a predetermined amount of expansion of the planar member 16.

According to the first embodiment, a plurality of large and small allowance regions 22 and 21 are defined in a predetermined first direction X of the planar direction extending along the liquid crystal panel 12 and a predetermined second direction Y crossing the first direction X of the planar direction extending along the liquid crystal panel 12. With this configuration, it is possible to suppress the advancing amount of the planar member 16 advancing outwardly in any planar directions thereof extending along the liquid crystal panel 12.

For example, when a 60-inch image display apparatus 10 according to a comparative example is formed as a liquid crystal display apparatus having a small frame as in the first embodiment, and the planar member 16 is generally convex in the thickness direction Z, if there is a temperature rise of 20° C., the thermal expansion and the amount of extension of the planar member 16 will increase, whereby the image quality and the evenness of the luminance may be affected. The influence on the image quality of the thermal expansion and the extension of the planar member 16 in the planar direction will increase as the image display region of the image display apparatus 10 increases.

(Second Embodiment)

Figure 4:
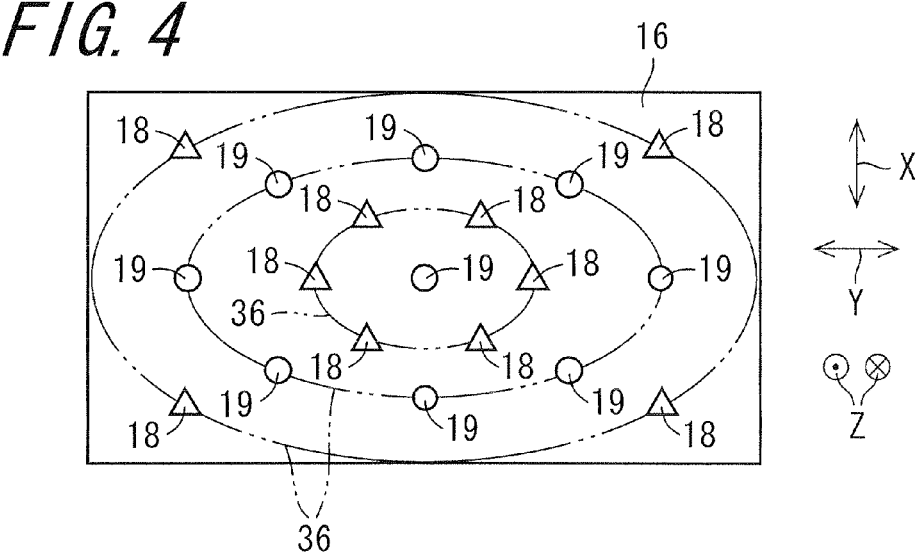
FIG. 4 is a view showing a planar member of a second embodiment of the technology and positions of the first and second protruding members for the planar member.

FIG. 4 is a view showing the planar member 16 of a second embodiment of the technology and positions of the first and second protruding members 18 and 19 for the planar member 16. In FIG. 4, the positions of the first protruding members 18 are depicted by triangles and the positions of the second protruding members 19 are depicted by circles, similarly to FIG. 3. The image display apparatus 10 according to the second embodiment is similar to the image display apparatus 10 according to the first embodiment, and only the difference between the first and second embodiments will be described.

In the second embodiment, the large allowance region 22 is defined in an annular form with respect to the center of the planar member 16. Specifically, both the large allowance region 22 and the small allowance region 21 are defined in an annular form with respect to the center of the planar member 16 as seen from the thickness direction Z. When the plurality of rod-shaped members that form the protruding portion 17 is seen from the thickness direction Z, the line connecting the position of each of the first or second protruding members 18 or 19 and the position of the same kind of rod-shaped member closest to the position forms the contour of an ellipsoid 36.

A direction of a major axis of the ellipsoid 36 is identical to the long-side direction of the liquid crystal panel 12 and the planar member 16, and a direction of a minor axis of the ellipsoid 36 is identical to the short-side direction. Although the ratio of the length of the major axis of the ellipsoid 36 to the length of the minor axis may be determined regardless of the aspect ratio of the display region of the screen, in the second embodiment, the ratio is set to be the same as the aspect ratio of the display region of the screen. That is, the ratio of the length of the major axis of the ellipsoid 36 to the length of the minor axis is determined to be 16:9, and when the respective ellipsoids 36 are imaginarily expanded about the center of the planar member 16, all the ellipsoids will inscribe the rectangle that forms the outer peripheral portion of the planar member 16.

The lines connecting the same kinds of adjacent rod-shaped members closest to the respective rod-shaped members of the protruding portion 17 are arranged such that as it advances from the central position of the planar member 16 as seen from the thickness direction Z towards outwardly in the planar direction thereof, a curve connecting the first protruding members 18 and a curve connecting the second protruding members 19 are arranged alternately. In addition, it is preferable that the rod-shaped member positioned closest to each of the rod-shaped members in the planar direction is of the same kind as the rod-shaped member.

According to the second embodiment, since the large allowance region 22 is defined in an annular form with respect to the center of the planar member 16, it is possible to form a plurality of large allowance regions 22 on any straight line parallel to the planar direction passing the center of the planar member 16. Therefore, as compared to the case where one large allowance region 22 is defined in at least one direction of the planar direction, it is possible to suppress the advancing amount of the planar member 16 advancing outwardly in any planar directions thereof.

(Third Embodiment)

Figure 5:
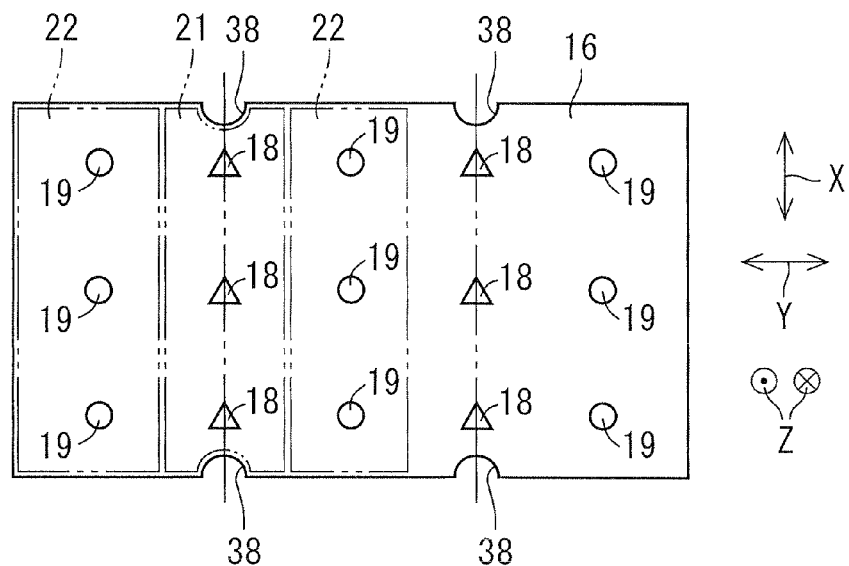
FIG. 5 is a view showing the planar member of a third embodiment of the technology and positions of the first and second protruding members for the planar member.

FIG. 5 is a view showing the planar member 16 of a third embodiment of the technology and positions of the first and second protruding members 18 and 19 for the planar member 16. In FIG. 5, the positions of the first protruding members 18 are depicted by triangles and the positions of the second protruding members 19 are depicted by circles, similarly to FIG. 3. The image display apparatus 10 according to the third embodiment is similar to the image display apparatus 10 according to the first embodiment, and only the difference between the first and third embodiments will be described.

In the third embodiment, notches 38 are formed in a part of the small allowance region 21 in the outer peripheral portion of the planar member 16 or in a part of the outer peripheral portion in the vicinity of the small allowance region 21. Among the small allowance regions 21 defined in the planar member 16, the small allowance region 21 defined so as to include the outer peripheral portion or in the vicinity of the outer peripheral portion is a region where the displacement towards the back side Z2 (chassis 13 side) is suppressed as compared to the large allowance region 22 adjacent to the small allowance region 21. In contrast, since the displacement of the adjacent large allowance region 22 towards the back side Z2 (chassis 13 side) is allowed as compared to the small allowance region 21, the small allowance region 21 is a portion which is bent more than the other regions. Here, "bent" means that the planar member 16 is bent within a range where the bent state can be restored without impairing the function of the planar member 16, and the radius of curvature of the bent portion is not particularly limited if it is within such a range.

In the third embodiment, the planar member 16 is formed in an approximately rectangular form. Since the notches 38 are formed, although the planar member 16 is not exactly rectangular, a rectangle when the shape of the planar member 16 is approximated to a substantially rectangular form will be referred to as "a virtual rectangle". The notch 38 is formed at positions where a straight line connecting a first protruding member 18 provided in the vicinity of the outer peripheral portion of the planar member 16 and a first protruding member 18 closest to the first protruding member crosses the contour of the virtual rectangle. The first protruding members 18 are aligned in the short-side direction, thus defining the small allowance region 21 which extends in the short-side direction.

When the planar member 16 is seen from the thickness direction Z and in parallel to the planar direction of the planar member 16, the direction facing away from a position included in the plane of the rectangle or the virtual rectangle of the planar member 16 at room temperature to the outer side of the rectangle or the virtual rectangle over the contour of the rectangle or the virtual rectangle will be referred to as "outwardly in the planar direction". Although the shape of the notch 38 is not particularly limited, the notch 38 is preferably formed in a shape that is defined by a smooth curve. In the third embodiment, the notch 38 is formed in a semicircular form that is concave towards inwardly in the planar direction thereof. If the notch 38 is formed in a shape that is defined by two crossing straight lines, there is a possibility that stress will concentrate at the notch 38. In contrast, by forming the shape of the notch 38 as a smooth curve, it is possible to prevent stress from concentrating thereon.

The respective small allowance regions 21 of the planar member 16 are defined so as to extend from one outer peripheral portion in the short-side direction to the other outer peripheral portion in the short-side direction and are arranged in a plurality of lines in the long-side direction. FIG. 5 shows the case where each of the small allowance regions 21 is defined by three first protruding members 18 arranged in the short-side direction, and two small allowance regions 21 are arranged in the long-side direction. In the long-side direction, the large allowance region 22 and the small allowance region 21 are alternately arranged, and the plurality of small allowance regions 21 are separated by the large allowance region 22 disposed therebetween. Moreover, the large allowance regions 22 are defined in the vicinity of both ends in the long-side direction of the planar member 16.

Since the notches 38 are formed in the outer peripheral portion of the planar member 16 at positions of the respective small allowance regions 21 where the line connecting the positions of the plurality of first protruding members 18 crosses the virtual rectangle, the planar member 16 can be easily bent about a ridge line which is the line connecting the plurality of first protruding members 18. Therefore, the large allowance regions 22 defined on both sides of the small allowance region 21 can be easily displaced in a convex shape towards the back side Z2 (chassis 13 side).

According to the third embodiment, since the planar member 16 is formed of a generally uniform material, the Young's modulus of the planar member 16 is uniform. Since the notches 38 are formed in a part of the small allowance region 21 in the outer peripheral portion of the planar member 16 or in a part of the outer peripheral portion in the vicinity of the small allowance region 21, it is possible to decrease a second moment of area of the planar member 16 when a bending moment of which the ridge line is parallel to the planar direction passing through the notch 38 is applied. Therefore, it is possible to decrease the rigidity to a bending moment of which the ridge line is parallel to the planar direction passing through the notch 38 and to make the planar member 16 easily bent at that portion. In this way, it is possible to allow displacement in the thickness direction Z, of other regions except the vicinities of the notch 38. Thus, it is possible to make displacement of the large allowance region 22 in the thickness direction Z easier than in the small allowance region 21.

(Fourth Embodiment)

Figure 6:
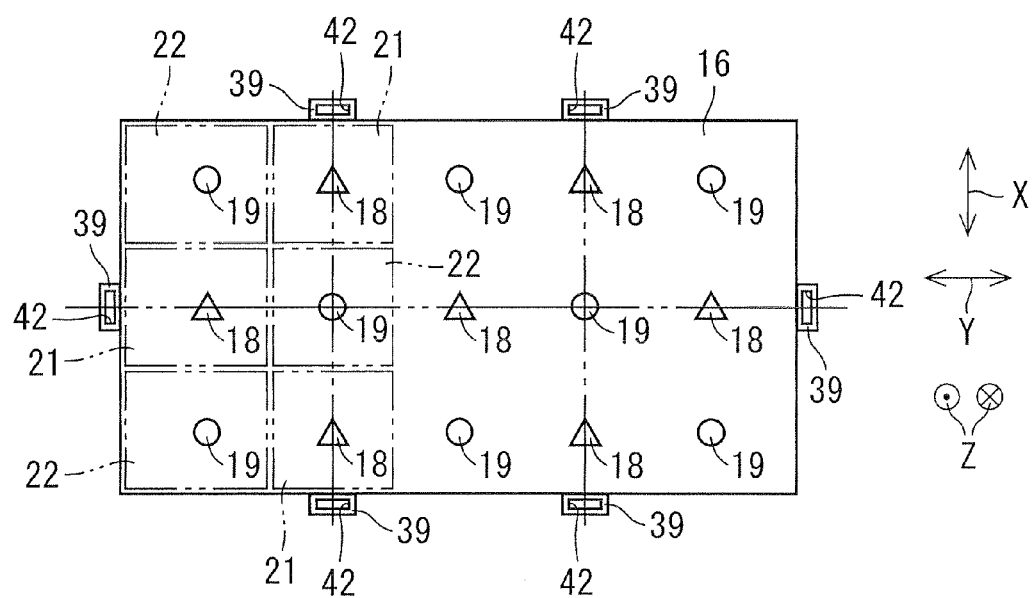
FIG. 6 is a view showing a planar member of a fourth embodiment of the technology and positions of the first and second protruding members for the planar member.

FIG. 6 is a view showing the planar member 16 of a fourth embodiment of the technology and positions of the first and second protruding members 18 and 19 for the planar member 16. In FIG. 6, the positions of the first protruding members 18 are depicted by triangles and the positions of the second protruding members 19 are depicted by circles, similarly to FIG. 3. The image display apparatus 10 according to the fourth embodiment is similar to the image display apparatus 10 according to the first embodiment, and only the difference between the first and fourth embodiments will be described.

In the fourth embodiment, convex portions 39 protruding outwardly in the planar direction are formed in a part of the small allowance region 21 in the outer peripheral portion of the planar member 16 or a part of the outer peripheral portion in the vicinity of the small allowance region 21. The image display apparatus 10 further includes the spacer 27 which is disposed between the convex portions 39 and the liquid crystal panel 12. The planar member 16 is formed in an approximately rectangular form. Since the convex portions 39 are formed, although the planar member 16 is not exactly rectangular, a rectangle when the shape of the planar member 16 is approximated to a substantially rectangular form will be referred to as "a virtual rectangle", similarly to the third embodiment.

The convex portions 39 are sandwiched between the spacer 27 and a member that forms the bezel 24. Although the planar member 16 may be fixed to the bezel 24 by the sandwiching, in the fourth embodiment, a fixing through-hole 42 is formed so as to penetrate through the convex portion 39 in the thickness direction Z. One through-hole 42 is formed for one convex portion 39, and convex engagement portions corresponding to the through-holes are formed on the member that forms the bezel 24. The convex engagement portions formed in the bezel 24 protrude towards the front side Z1 of the thickness direction so as to be inserted through the through-holes 42 of the convex portions 39 of the planar member 16 and come into contact with the spacer 27. In this way, the planar member 16 is fixed to the bezel 24 and the spacer 27 when the convex portions 39 engage with the convex engagement portions of the bezel 24.

The displacement in the thickness direction Z of the convex portions 39 of the planar member 16 is suppressed even when the convex portions 39 engage with the convex engagement portions or are sandwiched between the member that forms the bezel 24 and the spacer 27 without engaging with the convex engagement portions. That is, the displacement in the thickness direction Z of the planar member 16 in the convex portions 39 and at the vicinities thereof is suppressed similarly to the case where the displacement of the small allowance region 21 is regulated by the first protruding members 18. In the fourth embodiment, the plurality of rod-shaped members of the protruding portion 17 may be arranged in the same manner as the third embodiment shown in FIG. 5, and in that case, the same effects as the third embodiment can be obtained.

In the fourth embodiment, the plurality of rod-shaped members of the protruding portion 17 are arranged in the same manner as the first embodiment shown in FIG. 3. In that case, on the outer peripheral portion of the planar member 16 that forms the long sides of the virtual rectangle, a plurality of (specifically two) small allowance regions 21 are arranged in the long-side direction, and the convex portion 39 of the planar member 16 is formed in the vicinity of each of the small allowance regions 21. Moreover, one small allowance region 21 is formed in the short-side direction, and the convex portion 39 is formed in the vicinity of the small allowance region 21. In another embodiment, a plurality of small allowance regions 21 and a plurality of convex portions 39 may be formed in the short-side direction.

With this configuration, it is possible to prevent a portion of the planar member 16 in the vicinity of the convex portion 39 from being displaced in the thickness direction Z. Therefore, it is possible to determine the position of a portion where the displacement of the planar member 16 in the thickness direction Z is allowed and a portion where the displacement of the planar member 16 in the thickness direction Z is regulated.

(Fifth Embodiment)

Figure 7:
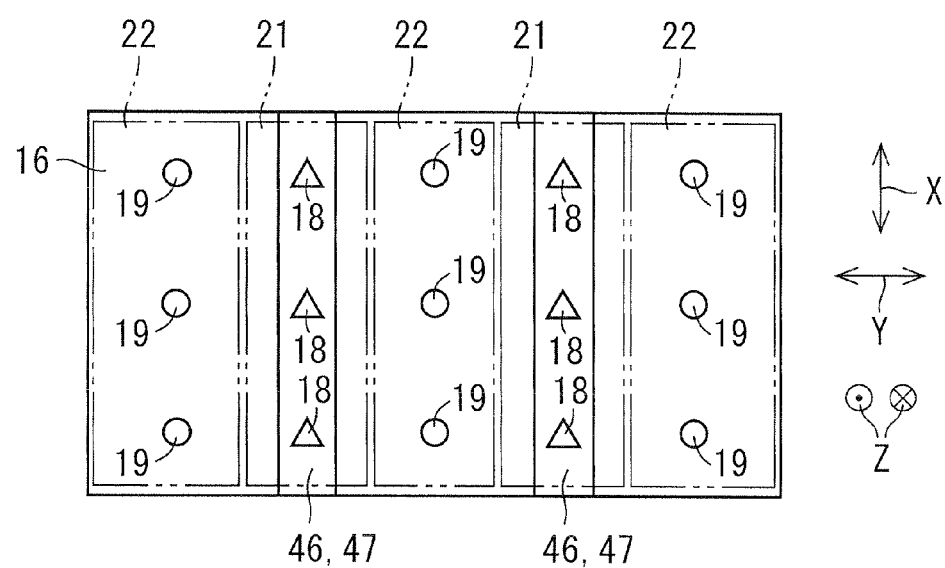
FIG. 7 is a view showing a planar member of a fifth embodiment of the technology and positions of the first and second protruding members for the planar member.

FIG. 7 is a view showing the planar member 16 of a fifth embodiment of the technology and positions of the first and second protruding members 18 and 19 for the planar member 16. In FIG. 7, the positions of the first protruding members 18 are depicted by triangles and the positions of the second protruding members 19 are depicted by circles, similarly to FIG. 3. The image display apparatus 10 according to the fifth embodiment is similar to the image display apparatus 10 according to the first embodiment, and only the difference between the first and fifth embodiments will be described.

In the fifth embodiment, the minimum value of the thickness dimension of the planar member 16 in the small allowance region 21 is set to be smaller than the thickness dimension of the planar member 16 in the large allowance region 22. Specifically, concave portions 46 are formed on the back side Z2 (chassis 13 side) of the planar member 16 so as to correspond to the position and shape of the small allowance regions 21. In the fifth embodiment, the plurality of rod-shaped members of the protruding portion 17 are arranged in the same manner as the third embodiment shown in FIG. 5. Since the respective small allowance regions 21 extend in the short-side direction, the concave portions 46 are also formed as grooves 47 extending in the short-side direction.

Although the cross-sectional shape of the portion where the grooves 47 are formed, taken along a virtual plane parallel to the thickness direction Z may be a part of a rectangle, a part of a rhombus, or a part of a circle, in the fifth embodiment, the cross-sectional shape is formed as a part of a circle. If the contour shape of the cross section of the portion where the grooves 47 are formed, taken along the direction vertical to the longitudinal direction of the grooves 47 is formed in a shape that is defined by two crossing straight lines, there is a possibility that stress will concentrate at the grooves 47. In contrast, by forming the contour shape of the cross section of the portion where the grooves 47 are formed, taken along the direction vertical to the longitudinal direction of the grooves 47 as a part of a circle, it is possible to prevent stress from concentrating thereon.

Since the minimum value of the thickness dimension of the small allowance region 21 is set to be smaller than the thickness dimension of the planar member 16 in the large allowance region 22, it is possible to decrease the second moment of area of the planar member 16 in the small allowance region 21. Therefore, it is possible to decrease the bending rigidity of the planar member 16 in the small allowance region 21. In this way, it is possible to allow displacement in the thickness direction Z, of other regions except the small allowance region 21. Thus, it is possible to make displacement of the large allowance region 22 in the thickness direction Z easier than in the small allowance region 21.

(Sixth Embodiment)

Figure 8:
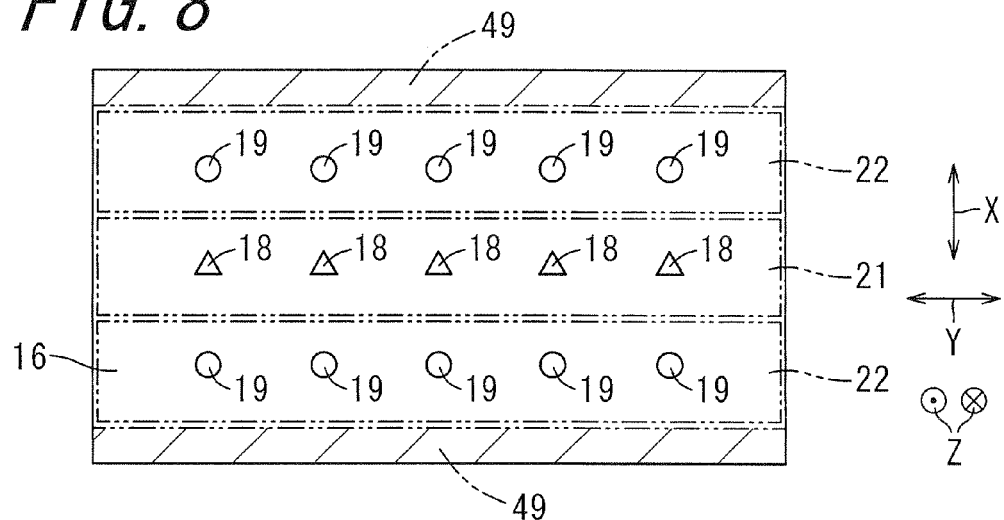
FIG. 8 is a view showing a planar member of a sixth embodiment of the technology and positions of the first and second protruding members for the planar member.

FIG. 8 is a view showing the planar member 16 of a sixth embodiment of the technology and positions of the first and second protruding members 18 and 19 for the planar member 16. In FIG. 8, the positions of the first protruding members 18 are depicted by triangles and the positions of the second protruding members 19 are depicted by circles, similarly to FIG. 3. The image display apparatus 10 according to the sixth embodiment is similar to the image display apparatus 10 according to the first embodiment, and only the difference between the first and sixth embodiments will be described.

In the sixth embodiment, the liquid crystal panel 12 is formed in a rectangular form, and the large allowance regions 22 are defined in a plurality of lines in the short-side direction of the liquid crystal panel 12. The outer peripheral portions 49 of the planar member 16 in the vicinity of both ends of the short-side direction are formed so as to extend in the long-side direction, and the outer peripheral portions in the vicinity of both ends of the long-side direction are formed so as to extend in the short-side direction. Among these outer peripheral portions, the outer peripheral portions 49 formed in the vicinity of both ends of the short-side direction so as to extend in the long-side direction are sandwiched between the member that forms the bezel 24 and the spacer 27. In FIG. 8, the outer peripheral portions 49 in the vicinity of both ends of the short-side direction are depicted by hatched portions.

Since the outer peripheral portions 49 formed in the vicinity of both ends of the short-side direction so as to extend in the long-side direction are sandwiched between the member that forms the bezel 24 and the spacer 27, it is possible to prevent displacement of that portion in the thickness direction Z. When the central portion or the like of the planar member 16, for example, is partially extended, a portion which is bent due to the extension is likely to extend to the outer peripheral portions 49 in the vicinity of both ends of the short-side direction, particularly in the short-side direction. In such a case, since the region where the extension of the planar member 16 is allowed is narrower in the short-side direction than in the long-side direction, by forming a plurality of large allowance regions 22 in the short-side direction, it is possible to efficiently allow the extension in the short-side direction.
(Seventh Embodiment)

Figure 9:
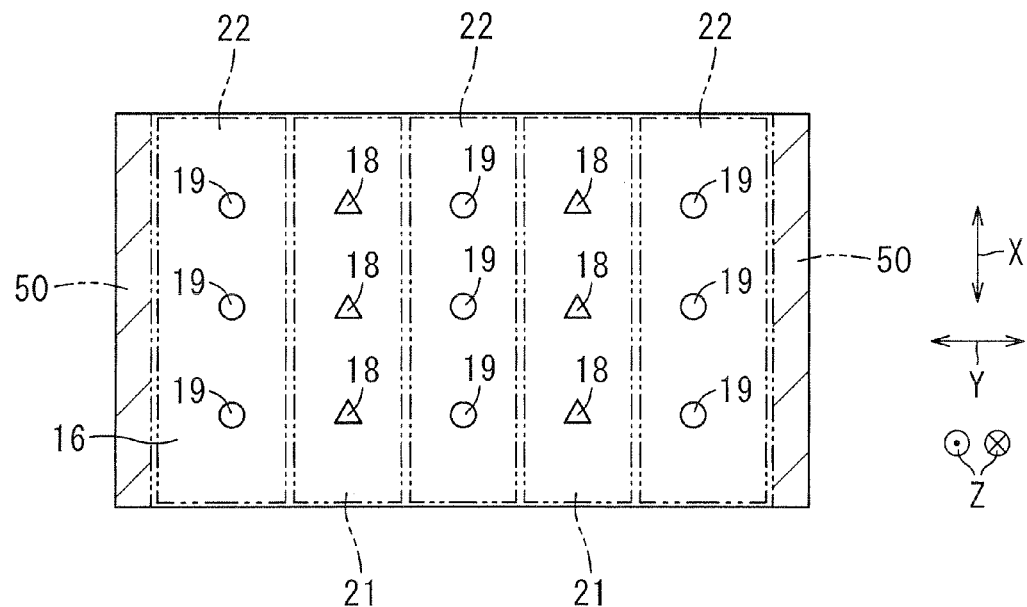
FIG. 9 is a view showing a planar member of a seventh embodiment of the technology and positions of the first and second protruding members for the planar member.

FIG. 9 is a view showing the planar member 16 of a seventh embodiment of the technology and positions of the first and second protruding members 18 and 19 for the planar member 16. In FIG. 9, the positions of the first protruding members 18 are depicted by triangles and the positions of the second protruding members 19 are depicted by circles, similarly to FIG. 3. The image display apparatus 10 according to the seventh embodiment is similar to the image display apparatus 10 according to the first embodiment, and only the difference between the first and seventh embodiments will be described.

In the seventh embodiment, the liquid crystal panel 12 is formed in a rectangular form, and the large allowance regions 22 are defined in a plurality of lines in the long-side direction of the liquid crystal panel 12. Among the outer peripheral portions of the planar member 16, the outer peripheral portions 50 formed in the vicinity of both ends of the long-side direction so as to extend in the short-side direction are sandwiched between the member that forms the bezel 24 and the spacer 27. In FIG. 9, the outer peripheral portions 50 in the vicinity of both ends of the long-side direction are depicted by hatched portions.

Since the large allowance regions 22 are defined in a plurality of lines in the long-side direction, even when the planar member 16 is expanded, it is possible to decrease the advancing amount of the planar member 16 advancing outwardly in the planar direction thereof in the long-side direction. When the linear expansion coefficient of the planar member 16 is the same in both the long-side direction and the short-side direction, the amount of extension in the long-side direction is larger than the amount of extension in the short-side direction. Therefore, by decreasing the advancing amount of the planar member 16 advancing outwardly in the planar direction thereof in the long-side direction; it is possible to decrease the maximum value of the advancing amount of the planar member 16 advancing outwardly in the planar direction thereof.

In the first to seventh embodiments, although the image display apparatus 10 has been described as being the image display apparatus 10 which is used in televisions or personal computers, the image display apparatus 10 may be an apparatus in which there is a possibility that the planar member 16 is extended to advance outwardly in the planar direction thereof, and the extension of the planar member 16 advancing outwardly in the planar direction is regulated by the bezel 24 or the peripheral member disposed around the planar member 16. For example, in another embodiment, the image display apparatus 10 may be a portable phone, a personal digital assistance (PDA), a tablet-type electronic apparatus, a timepiece that presents a digital presentation, and the like.

In the first to seventh embodiments, although the light source 30 has been described to emit light from the back side Z2 of the planar member 16, the light source 30 may be configured to emit light from a side surface of the planar member 16 facing outwardly in the planar direction thereof so as to enter the planar member 16, for example, in a portable phone or the like.

In the first to seventh embodiments, although the liquid crystal panel 12 and the planar member 16 have been described as having a flat plate-like shape, in another embodiment, they may be formed in a slightly curved shape.
(Eighth Embodiment)

Figure 10:
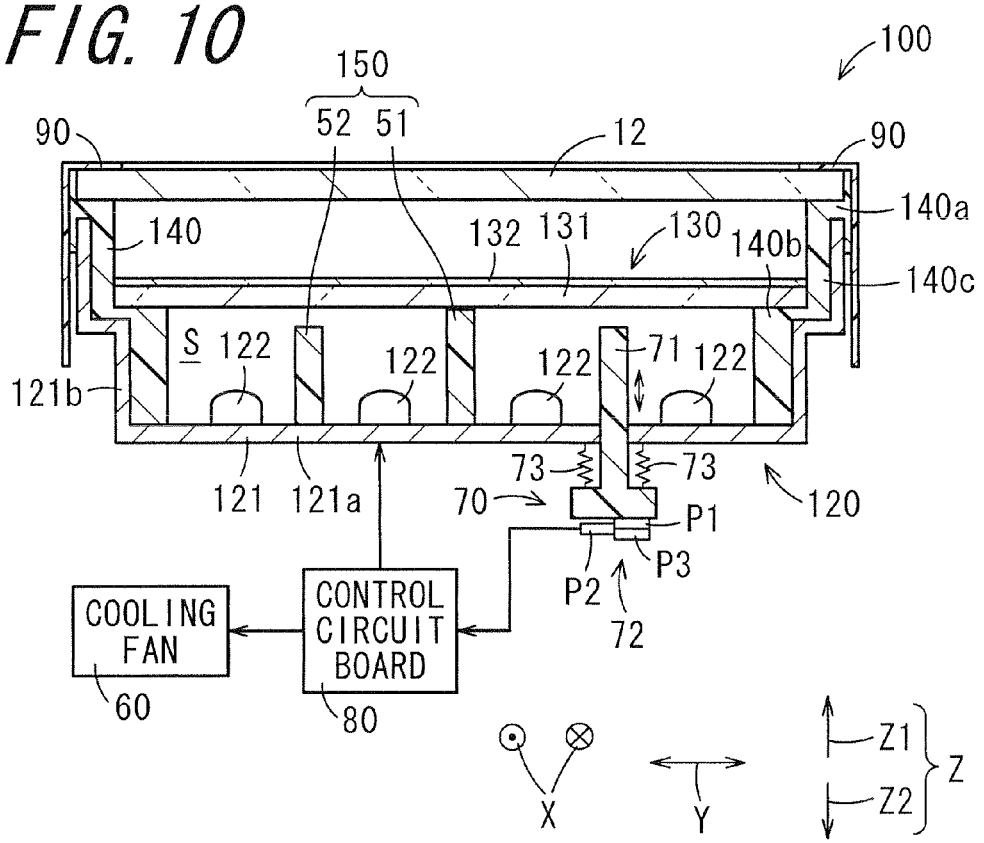
FIG. 10 a cross-sectional view showing a schematic configuration of a liquid crystal display apparatus according to an eighth embodiment of the technology.
Figure 11:
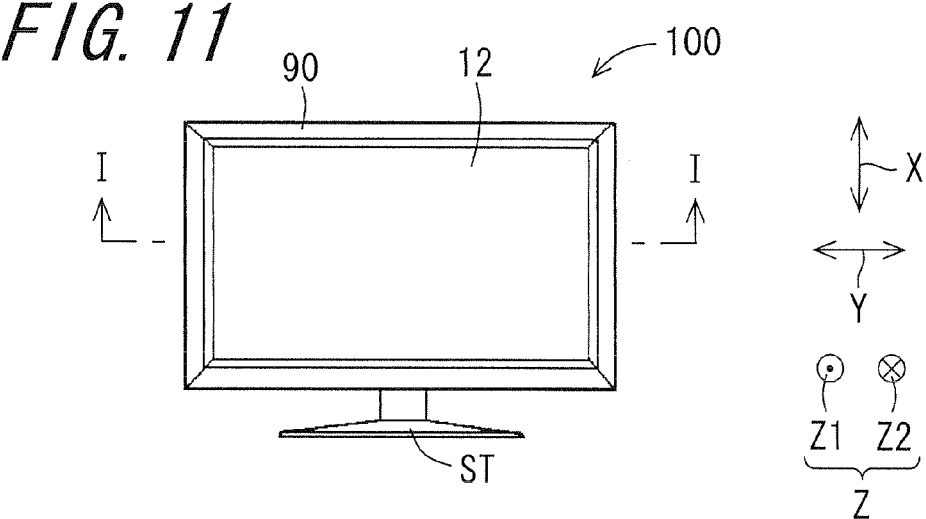
FIG. 11 is a front view of the liquid crystal display apparatus in a state of use according to the eighth embodiment of the technology.

FIG. 10 is a cross-sectional view showing a schematic configuration of a liquid crystal display apparatus 100 according to an eighth embodiment of the technology. FIG. 11 is a front view of the liquid crystal display apparatus 100 in a state of use according to the eighth embodiment of the technology. FIG. 10 corresponds to the cross-sectional view taken along the line I-I shown in FIG. 11.

The liquid crystal display apparatus 100 which is an image display apparatus includes a liquid crystal panel 12 which is a non-light-emitting display panel capable of displaying images, a backlight unit 120 having light sources 122 disposed on the back side of the liquid crystal panel 12 so as to illuminate the liquid crystal panel 12, an optical member 130 arranged between the liquid crystal panel 12 and the light sources 122, a frame 140 that supports the optical member 130, a protruding portion 150 that regulates bending deformation of the optical member 130 towards the back side, a cooling unit 60 for cooling down the backlight unit 120, a deformation amount detection element 70 for detecting a deformation amount of the optical member 130, a control circuit board 80 mounting a control circuit which controls driving of the light source 122 and the cooling unit 60 based on the detection results outputted from the deformation amount detection element 70 so that the deformation amount of the optical member 130 decreases, and a frame-shaped bezel 90 that integrally holds the liquid crystal panel 12 and the backlight unit 120.

As shown in FIG. 11, the liquid crystal display apparatus 100 is used in such a posture that the short-side direction of the liquid crystal panel 12 is identical to the vertical direction and is supported by a stand ST, for example. Here, in the drawing, the direction indicated by an arrow X is a direction parallel to the short-side direction of the liquid crystal panel 12, the direction indicated by an arrow Y is a direction parallel to the long-side direction of the liquid crystal panel 12, and the direction indicated by an arrow Z is a direction parallel to the depth direction of the liquid crystal display apparatus 100. The short-side direction X, the long-side direction Y, and the depth direction Z are orthogonal to each other.

In the description of the embodiment, the front side is a side where the liquid crystal panel 12 is disposed when the liquid crystal display apparatus 100 is seen from the depth direction Z, namely the side facing the direction indicated by an arrow Z1. The back side is a side where the backlight unit 120 is disposed when the liquid crystal display apparatus 100 is seen from the depth direction Z, namely the side facing the direction indicated by an arrow Z2.

Hereinafter, the respective configurations of the liquid crystal display apparatus 100 will be described.

The liquid crystal panel 12 includes a pair of transparent glass substrates which is formed in a horizontally long rectangular form and a liquid crystal layer in which liquid crystal molecules of which optical properties are changed by an applied electric field are filled between the pair of substrates. The pair of substrates is bonded by a sealing agent while maintaining the gap corresponding to the thickness of the liquid crystal layer. When the liquid crystal display apparatus 100 has a display screen having a size of 60 inches, the rectangular liquid crystal panel 12 is approximately 750 mm in the short-side dimension and approximately 1300 mm in the long-side dimension.

One of the pair of substrates is a CF (Color Filter) substrate and the other substrate is a TFT (Thin Film Transistor) substrate. In the TFT substrate, TFTs which are switching elements and pixel electrodes are arranged in a number of lines on the inner surface side facing the liquid crystal layer, and gate lines and source lines are arranged in a grid form so as to surround the TFTs and pixel electrodes. The pixel electrodes are formed of transparent electrodes such as ITO (Indium Tin Oxide) or ZnO (Zinc Oxide).

In the CF substrate, a number of color filters are arranged in a line at positions corresponding to the respective pixels on the inner surface side facing the liquid crystal layer. The color filters are arranged such that subpixels of the three colors R (red), G (green), and B (blue) are alternately arranged in a line. A light-shielding layer (black matrix) is formed among the respective color filters so as to prevent color mixing. On the surface of the color filters and the light-shielding layer, an opposing electrode is provided so as to face the pixel electrodes on the side of the TFT substrate. Moreover, an alignment film for aligning the liquid crystal molecules included in the liquid crystal layer is formed on the inner surface sides of the respective substrates, and a polarization plate is attached to the outer surface sides on the opposite side of the inner surface sides of the respective substrates.

The backlight unit 120 which is an illumination unit includes a backlight chassis 121 formed in an approximately box-like shape which is opened to one side thereof, the light sources 122 accommodated in the backlight chassis 121, and a reflective sheet (not shown) which is laid in the backlight chassis 121. The backlight unit 120 according to this embodiment is configured as a so-called direct backlight in which the light sources 122 are disposed directly below the back surface of the liquid crystal panel 12 as shown in FIG. 10.

The backlight chassis 121 is made of a metal and includes a bottom plate 121a which is formed in a horizontally long rectangular form similarly to the liquid crystal panel 12 and a side plate 121b erected from the peripheral portion of the bottom plate 121a. In this way, the backlight chassis 121 is formed in an approximately box-like shape which is opened to one side thereof. In the following description, the inner surface of the backlight chassis 121 is a surface on the side facing an accommodation space S which is surrounded by the bottom plate 121a and the side plate 121b, and the outer surface is a surface on the side facing the outer side on the opposite side of the inner surface.

The light sources 122 which are illumination light sources are provided on the inner surface of the bottom plate 121a of the backlight chassis 121 and emit light to illuminate the liquid crystal panel 12. In this embodiment, the light sources 122 are configured by disposing a plurality of LED (Light Emitting Diode) lamps on the inner surface of the bottom plate 121a in a matrix form. In another embodiment, the light sources 122 may be configured by disposing a plurality of lines of cathode-ray tubes on the inner surface of the bottom plate 121a in parallel to each other with a predetermined gap therebetween.

The reflective sheet is made of a synthetic resin which has excellent light reflectivity and exhibits white color and is laid so as to cover the inner surface of the bottom plate 121a of the backlight chassis 121 and the inner surface of the frame 140 mounted on the side plate 121b. The reflective sheet enables most of the light emitted from the light sources 122 to be guided to the opening of the backlight chassis 121. In another embodiment, instead of providing the reflective sheet, the portion which is to be covered by the reflective sheet may be formed of a resin or a metal which has excellent light reflectivity. In this way, it is possible to omit the reflective sheet and decrease the number of components.

The optical member 130 includes a planar member 131 which is formed in a horizontally long rectangular form similar to the liquid crystal panel 12 and an optical sheet 132 which is laminated on one surface in the thickness direction of the planar member 131 and is composed of one or more sheet-shaped members. In this embodiment, as the planar member 131, a diffuser plate having the function of diffusing the light emitted from the light sources 122 in a planar direction thereof is used.

In another embodiment, as the planar member 131, a reinforcing plate having light transmitting properties may be used instead of the diffuser plate. The reinforcing plate is a plate-shaped member which is used for suppressing bending of the optical sheet 132, for example, when the diffuser plate is not necessary because the light sources 122 and the liquid crystal panel 12 are sufficiently separated from each other. Alternatively, the reinforcing plate is a plate-shaped member which is used by being disposed in close proximity to the liquid crystal panel 12 when it is desired to suppress the bending of the liquid crystal panel 12 towards the back side resulting from externally applied force to be within a predetermined amount of bending. Alternatively, the reinforcing plate is a plate-shaped member which is used by being disposed on both sides in the thickness direction of the diffuser plate in order to reinforce the diffuser plate when the diffuser plate is made thinner than its typical thickness so as to decrease the cost.

As for the material of the planar member 131, an acrylic resin, polystyrene, and polycarbonate are preferably used, for example. The linear expansion coefficient of the planar member 131 made from these materials is approximately $70 \times 10^{-6}$/°C.

The thickness of the planar member 131 is determined based on the size of the display screen of the liquid crystal display apparatus 100. For example, when the size of the display screen is 32 inches, the thickness is determined to be about 1.5 mm. Moreover, when the size of the display screen is 60 inches, the thickness is determined to be about 2.5 mm, and when the size of the display screen is 100 inches, the thickness is determined to be about 4 mm. In the following description, the planar member 131 will be referred to as a diffuser plate 131. The optical sheet 132 is formed, for example, by laminating a diffusion sheet, a lens sheet, and a polarization luminance enhancing film in that order from the side of the diffuser plate 131.

The frame 140 is made of a resin and is formed in an approximately box-like shape so as to cover the inner surfaces of the side plate 121*b* of the backlight chassis 121. The frame 140 is mounted on the side plate 121*b* and fixed to the side plate 121*b* by a fastening such as a screw.

The frame 140 has a supporting portion 140*a* which is disposed on the opening on the opposite side of the opening close to the bottom plate 121*a* when the frame 140 is mounted on the side plate 121*b* so as to support the liquid crystal panel 12. In addition, the frame 140 has a supporting portion 140*b* which is disposed in the intermediate portion of the two openings so as to support the optical member 130 and a sidewall portion 140*c* connected to the supporting portion 140*b*.

The supporting portion 140*a* has a rectangular circular flat supporting surface for supporting the liquid crystal panel 12. The supporting surface is formed in parallel or approximately parallel to the inner surface of the bottom plate 121*a* of the backlight chassis 121 when the frame 140 is mounted on the side plate 121*b*.

The liquid crystal panel 12 is provided on the supporting portion 140*a* so that the TFT substrate makes surface-contact with the supporting surface. In this way, the liquid crystal panel 12 is supported by the supporting portion 140*a* in a posture wherein it is parallel or approximately parallel to the inner surface of the bottom plate 121*a*. At that time, the supporting portion 140*a* supports the peripheral portion of the liquid crystal panel 12. The liquid crystal panel 12 supported by the supporting portion 140*a* is fixed by being sandwiched by the supporting portion 140*a* and the bezel 90 from both sides in the thickness direction.

The supporting portion 140*b* has a rectangular circular flat supporting surface for supporting the optical member 130. The supporting surface is formed in parallel or approximately parallel to the inner surface of the bottom surface 121*a* of the backlight chassis 121 when the frame 140 is mounted on the side plate 121*b*.

The optical member 130 is provided on the supporting portion 140*b* so that the diffuser plate 131 makes surface-contact with the supporting surface. In this way, the optical member 130 is supported by the supporting portion 140*b* in a posture wherein it is parallel or approximately parallel to the inner surface of the bottom plate 121*a*. At that time, the supporting portion 140*b* supports the peripheral portion of the diffuser plate 131.

The sidewall portion 140*c* has an inner wall surface which is erected vertically from the outer circumference of the supporting surface of the supporting portion 140*b*. In the liquid crystal display apparatus 100 according to this embodiment, in order to realize a large screen size and a narrow frame, the sidewall portion 140*c* are designed so that the gap formed between the outer peripheral portion of the optical member 130 provided on the supporting portion 140*b* and the inner wall surface has a dimension that is not sufficient to allow extension of the optical member 130 towards the planar direction caused by thermal expansion occurring when the liquid crystal display apparatus 100 operates. For example, the gap is 1 mm or smaller, for example.

In this embodiment, a plurality of protruding engagement portions are formed on the outer circumferential portion of the optical member 130 so as to protrude in the planar direction. Moreover, engagement holes are formed on portions of the sidewall portion 140*c* where the protruding engagement portions are disposed when the optical member 130 is provided on the supporting portion 140*b* so as to be fitted to the protruding engagement portions. The optical member 130 is fixed to the frame 140 when the protruding engagement portions are fitted to the engagement holes, whereby the displacement of the optical member 130 in a direction away from the supporting surface of the supporting portion 140*b* is regulated.

The image display apparatus 100 is supplied with power from a power source and operates by the power used as a drive power. In an operating state, power is supplied to the light sources 122, and light is emitted from the light sources 122. Among the light emitted from the light sources 122, a straight polarized light having passed through the polarization plate provided on the back side of the liquid crystal panel 12 passes through the liquid crystal layer and enters the polarization plate provided on the front side of the liquid crystal panel 12. At that time, the polarization state of the light passing through the liquid crystal layer can be changed by the electric field applied to the liquid crystal layer. Therefore, by applying a voltage corresponding to the image information inputted to the liquid crystal display apparatus 100 to the pixel electrodes of the CF substrate and the opposing electrodes of the TFT substrate to apply an electric field to the liquid crystal layer, it is possible to change the polarization state of the light passing through the liquid crystal layer and control the amount of light passing through the polarization plate. In this way, it is possible to display an optical image based on the image information inputted to the liquid crystal display apparatus 100 on the liquid crystal panel 12.

In the operating state of the liquid crystal display apparatus 100, the temperature of the respective members provided around the light sources 122 and the air surrounding the light sources 122 increases due to heat generation of the light sources 122 emitting light. Therefore, in the operating state of the liquid crystal display apparatus 100, the optical member 130 provided so as to face the light sources 122 is thermally expanded due to the temperature rise. For example, in the optical member 130 mounted on the liquid crystal display apparatus 100 of which the display screen has a size of 60 inches, when there is a temperature rise of 50° C. from room temperature, an extension of about 4.7 mm occurs in the long-side direction Y.

However, in the liquid crystal display apparatus 100, as described above, the gap formed between the outer peripheral portion of the optical member 130 provided on the supporting portion 140*b* and the inner wall surface of the sidewall portion 140*c* is designed to be a dimension which does not allow the extension of the optical member 130 in the planar direction due to the thermal expansion. Therefore, in the liquid crystal display apparatus 100, as the internal temperature increases, the optical member 130 is deformed by being bent. More specifically, since the temperature on the side of the optical member 130 facing the light sources 122 is higher than the temperature on the side facing the liquid crystal panel 12, the amount of extension in the planar direction increases. Thus, the optical member 130 is deformed by being bent in a convex shape towards the back side. Moreover, as the amount of bending towards the back side increases, the optical member 130 is unable to perform its function sufficiently, and the quality of displayed images will deteriorate, for example, in the form of generation of luminance unevenness.

Therefore, in the liquid crystal display apparatus 100, the protruding portion 150 is provided so as to regulate the bending deformation of the optical member 130 towards the back side. Specifically, the protruding portion 150 includes first protruding members 51 and second protruding members 52 which both are erected vertically from the inner surface of the bottom plate 121*a* of the backlight chassis 121 towards the optical member 130, and of which the heights from the inner surface of the bottom plate 121*a* are different. The first and second protruding members 51 and 52 are formed of polycarbonate having high reflectivity, for example.

The first protruding members 51 are formed so that the height from the inner surface of the bottom plate 121a is a predetermined height h1. Here, the predetermined height h1 is set to a height such that the tip ends of the first protruding members 51 come into contact with the optical member 130 at room temperature supported by the supporting portion 140b or are slightly separated from the optical member 130 at room temperature. Here, the optical member 130 at room temperature is the optical member 130 which is not thermally deformed due to the operation of the liquid crystal display apparatus 100.

The second protruding members 52 are formed so that the height from the inner surface of the bottom plate 121a is a predetermined height h2. Here, the predetermined height h2 is lower than the predetermined height h1 and is set to a height such that the tip ends of the second protruding members 52 are separated from the optical member 130 at room temperature supported by the supporting portion 140b by a distance corresponding to the maximum allowable amount of bending. Here, the maximum allowable amount of bending is the amount of bending of the optical member 130 towards the back side and is the maximum value within the numeric range which is set in advance as the amount of bending in which images can be displayed without deteriorating the image quality.

Figure 12:
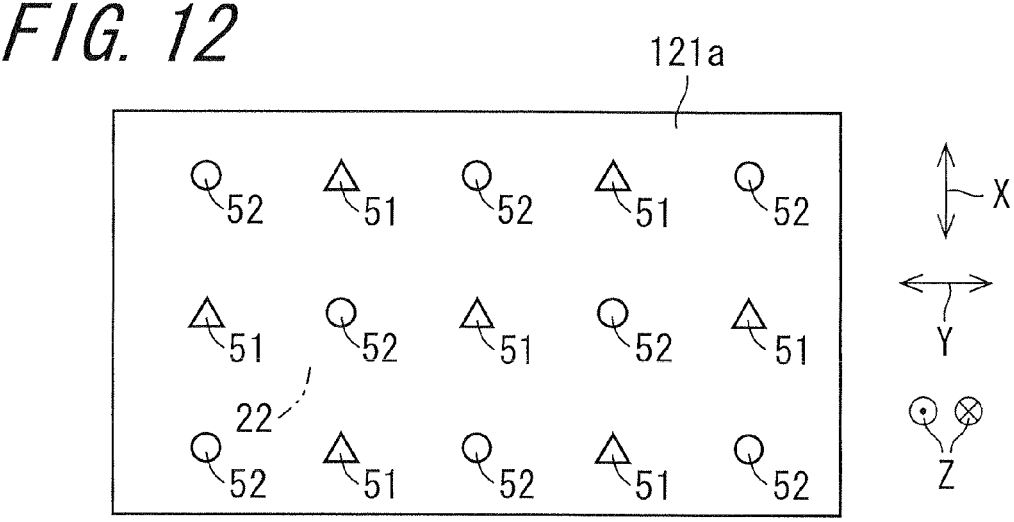
FIG. 12 is a view showing an example of an arrangement of the first and second protruding members on an inner surface of a bottom plate.
Figure 13:
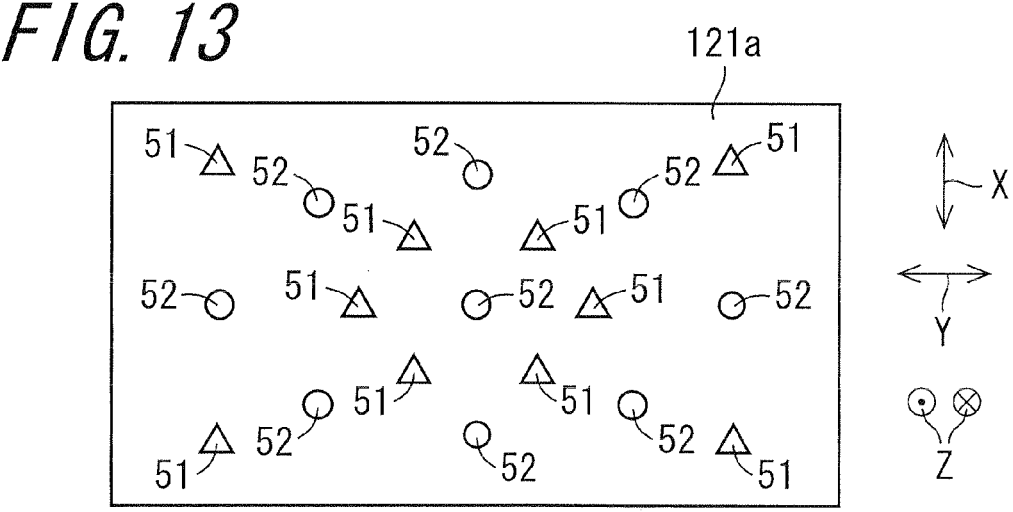
FIG. 13 is a view showing an another example of the arrangement of the first and second protruding members on the inner surface of the bottom plate.

The protruding portion 150 can regulate the bending deformation of the optical member 130 towards the back side by appropriately arranging the first and second protruding members 51 and 52 on the inner surface of the bottom plate 121a in a plurality of lines. FIG. 12 shows an example of the arrangement of the first and second protruding members 51 and 52 on the inner surface of the bottom plate 121a as seen from the front side. FIG. 13 shows another example of the arrangement of the first and second protruding members 51 and 52 on the inner surface of the bottom plate 121a as seen from the front side. In FIGS. 12 and 13, positions of the first protruding members 51 are depicted by triangles and positions of the second protruding members 52 are depicted by circles.

In the arrangement example of FIG. 12, the first and second protruding members 51 and 52 are arranged in a matrix form, and the first and second protruding members 51 and 52 are alternately arranged in the row and column directions. In the arrangement example of FIG. 13, the first and second protruding members 51 and 52 are arranged in a radial form around the center of the planar direction, and the first and second protruding members 51 and 52 are alternately arranged in a radial direction.

Figure 14:
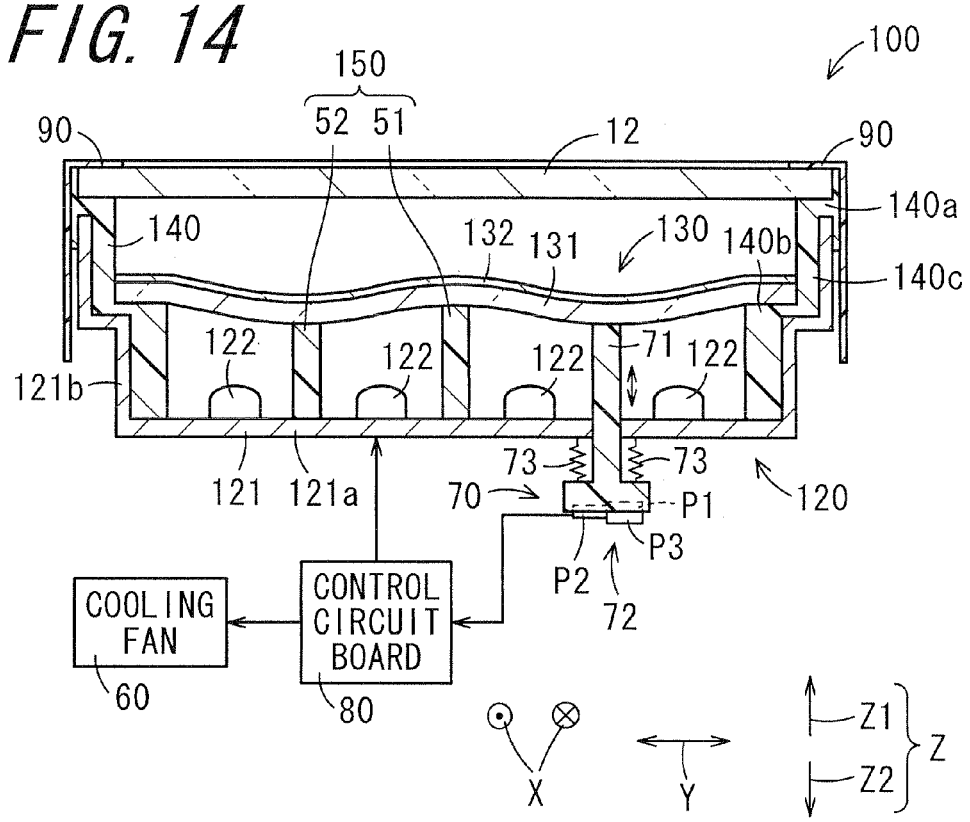
FIG. 14 is a cross-sectional view of the liquid crystal display apparatus in an operating state.

FIG. 14 is a cross-sectional view of the liquid crystal display apparatus 100 in the operating state. As described above, since the first protruding members 51 having the predetermined height h1 and the second protruding members 52 having the predetermined height h2 are alternately arranged, the optical member 130 is bent in a wavy form, and the second protruding members 52 regulate the portions of the optical member 130 facing the tip ends of the second protruding members 52 from being displaced towards a side of the light sources 122 with respect to the tip ends of the second protruding members 52. In this way, it is possible to prevent the amount of bending of the optical member 130 from increasing above the maximum allowable amount of bending.

The cooling unit 60 is a device for cooling down the backlight unit 120 and is mounted on the back side of the backlight chassis 121. In this embodiment, the cooling unit 60 is configured by a cooling fan. In the following description, the cooling unit 60 will be referred to as a cooling fan 60.

The deformation amount detection element 70 is configured to detect the deformation amount of the optical member 130. In this embodiment, the deformation amount detection element 70 is configured to detect the amount of bending of the optical member 130 towards the back side and is provided in the vicinity of the position where the second protruding members 52 are erected. In this way, by using the deformation amount detection element 70, it is possible to detect the amount of bending of the diffuser plate 131 at the initial stage where the amount of bending of the diffuser plate 131 towards the back side is relatively small. When a plurality of deformation amount detection elements 70 are provided, they are provided for each of the second protruding members 52. In another embodiment, the deformation amount detection elements 70 may be provided at the positions of the second protruding members 52 shown in FIGS. 12 and 13 in place of the second protruding members 52.

Specifically, the deformation amount detection element 70 has a displacement member 71 which is supported at an initial position on the back side of the optical member 130 separated by a predetermined distance from the optical member 130 at room temperature supported by the supporting portion 140b and which is provided so as to be displaceable in a direction towards or away from the optical member 130, namely in the depth direction Z, a displacement amount detection section 72 that detects the amount of displacement of the displacement member 71 in the direction Z2 from the initial position, and an extension coil spring 73 that biases the displacement member 71 in the direction towards the optical member 130, namely the direction Z1.

The displacement member 71 is formed in an approximately rod shape and is formed of the same material as the first and second protruding members 51 and 52, for example. The displacement member 71 is inserted through a through-hole formed on the bottom plate 121a of the backlight chassis 121, and the extension coil spring 73 is attached between the bottom plate 121a and a detection-side end of the displacement member 71 disposed on the back side of the bottom plate 121a so as to bias the displacement member 71 in the direction Z1. The extension coil spring 73 supports the displacement member 71 so that the displacement member 71 maintains its initial position.

The initial position is determined to be a position such that the tip end of the contact-side end of the displacement member 71 disposed on the front side of the bottom plate 121a is disposed on the front side with respect to the tip ends of the second protruding members 52. For example, the initial position is determined to be a position such that the tip end of the contact-side end is disposed at the same height position as the tip ends of the first protruding members 51.

The displacement amount detection section 72 includes a plurality of photointerrupters P1 to P3 which is an optical detection section that detects the amount of displacement of the displacement member 71 from the initial position. The respective photointerrupters P1 to P3 are provided at a position facing a passage region where the tip end of the detection-side end of the displacement member 71 passes in accordance with the displacement of the displacement member 71 towards the direction Z2 from the initial position. The respective photointerrupters P1 to P3 are provided at different positions in the direction Z2.

For example, the respective photointerrupters P1 to P3 are provided at positions which are separated by distances of $\alpha$, $\beta$, and $\gamma$ (where $\alpha<\beta<\gamma$) in the direction Z2 from the tip end of the detection-side end of the displacement member 71 in the initial position. In this way, the displacement amount detection section 72 is able to detect that the amount of displacement of the displacement member 71 from the initial position has reached α, β, and γ. That is, the displacement amount detection section 72 is configured to detect the amount of displacement of the displacement member 71 from the initial position in a stepwise manner. The displacement amount detection section 72 outputs the results of the detection by the photointerrupters P1 to P3 to the control circuit board 80.

Figure 15:
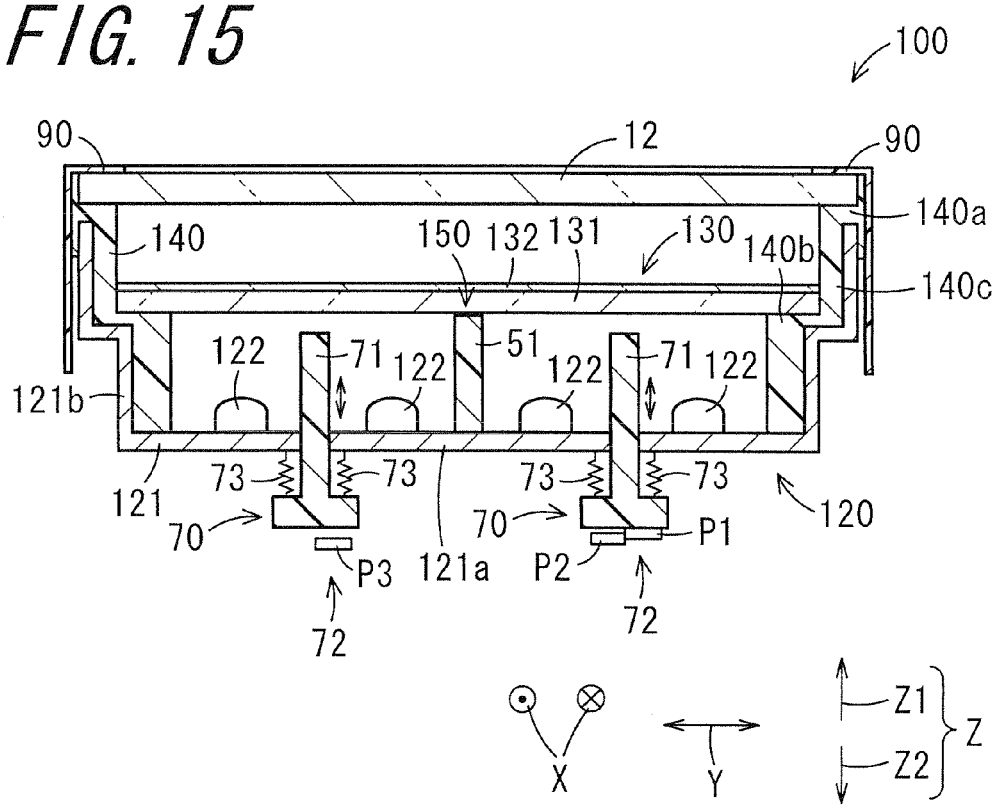
FIG. 15 is a cross-sectional view of the liquid crystal display apparatus when arrangement positions of the photointerrupters in a direction Z2 are different for each of the deformation amount detection elements.

When the plurality of photointerrupters P1 to P3 is used, instead of disposing all photointerrupters P1 to P3 to one deformation amount detection element 70, the photointerrupters P1 to P3 may be disposed to be distributed to a plurality of deformation amount detection elements 70, and the arrangement positions of the photointerrupters P1 to P3 in the direction Z2 may be different for each of the deformation amount detection elements 70. FIG. 15 is a cross-sectional view of the liquid crystal display apparatus 100 when the arrangement positions of the photointerrupters P1 to P3 in the direction Z2 are different for each of the deformation amount detection elements 70. Since the diffuser plate 131 will be bent at any position where the second protruding members 52 are disposed, even when the amount of bending of the diffuser plate 131 increases, the amount of bending of the diffuser plate 131 can be detected in a stepwise manner by the photointerrupters at different positions.

The control circuit board 80 includes a control circuit which is mounted on the back side of the backlight chassis 121 and is configured to control the driving of the light sources 122 and the cooling fan 60.

Figure 16:
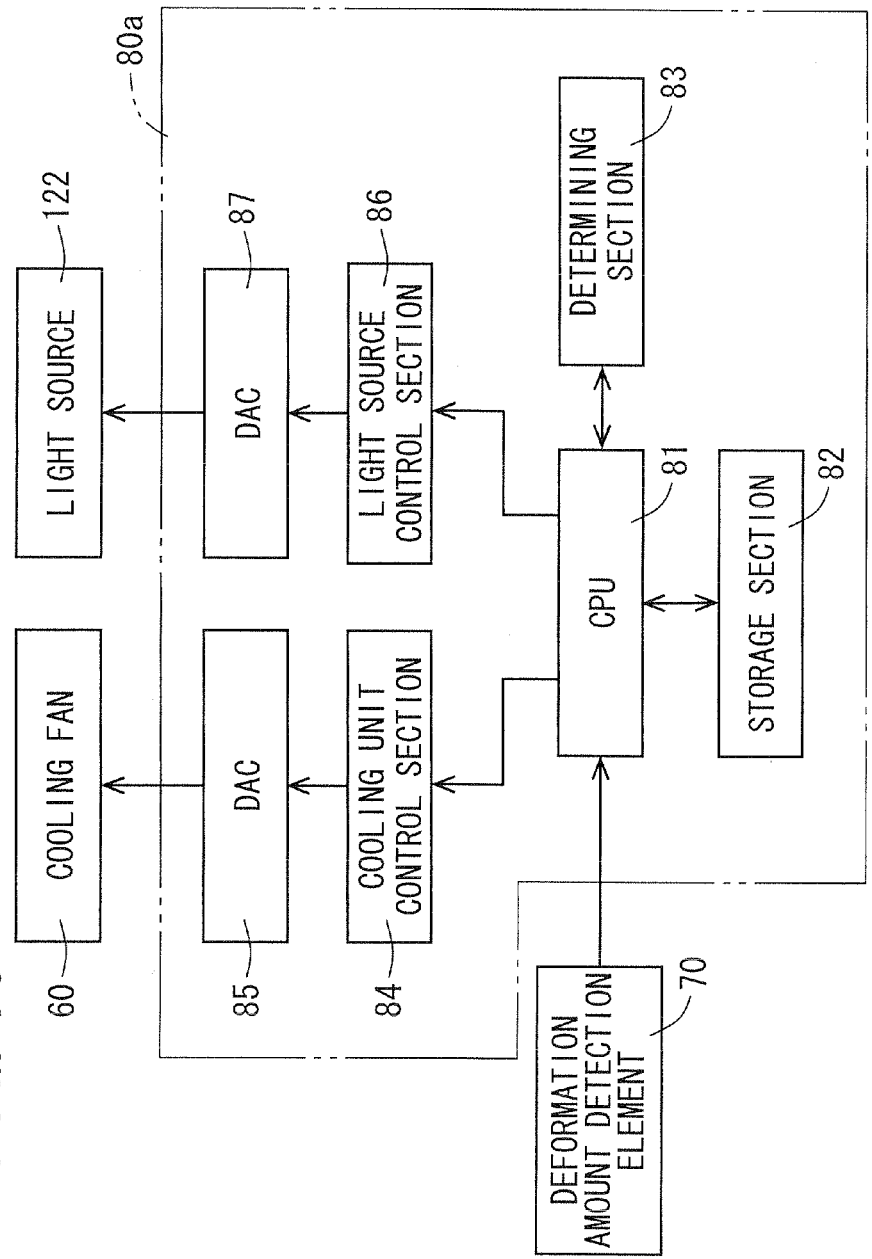
FIG. 16 is a block diagram showing an electrical configuration of the liquid crystal display apparatus.

FIG. 16 is a block diagram showing an electrical configuration of the liquid crystal display apparatus 100. The liquid crystal display apparatus 100 includes the deformation amount detection element 70 for detecting the deformation amount of the diffuser plate 131, and the control circuit board 80, and includes a control circuit 80a to which the results of the detection by the deformation amount detection element 70 are inputted, and the light sources 122 and the cooling fan 60 which are controlled by the control circuit 80a based on the detection results.

The control circuit 80a includes a CPU (Central Processing Unit) 81, a storage section 82, a determining section 83, a cooling unit control section 84, a DAC (Digital to Analog Converter) 85, a light source control section 86, and a DAC 87.

The CPU 81 controls the determining section 83, the cooling unit control section 84, and the light source control section 86 in accordance with a program stored in the storage section 82.

The storage section 82 stores data concerning a preset duty ratio of voltage supplied to the cooling fan 60 and data concerning a duty ratio of voltage supplied to the light sources 122 in association with the deformation amount of the diffuser plate 131.

The determining section 83 determines duty ratios of voltage supplied to the cooling fan 60 and the light sources 122 corresponding to the detection results on the deformation amount outputted from the deformation amount detection element 70 based on the data stored in the storage section 82.

The cooling unit control section 84 outputs a control signal for controlling the starting and stopping of a variable-speed cooling fan motor for rotating the fan of the cooling fan 60 and a control signal for controlling the duty ratio of the voltage supplied to the cooling fan motor during the driving of the cooling fan motor to the DAC 85 in accordance with a command from the CPU 81.

The DAC 85 converts the control signal input from the cooling unit control section 84 into an analog voltage and outputs the analog voltage to the cooling fan 60.

The light source control section 86 outputs a control signal for controlling the lighting of the light sources 122 and a control signal for controlling a duty ratio of voltage supplied to the light sources 122 during the lighting of the light sources 122 to the DAC 87 in accordance with a command from the CPU 81.

The DAC 87 converts the control signal inputted from the light source control section 86 into an analog voltage and outputs the analog voltage to the light sources 122.

Figure 17:
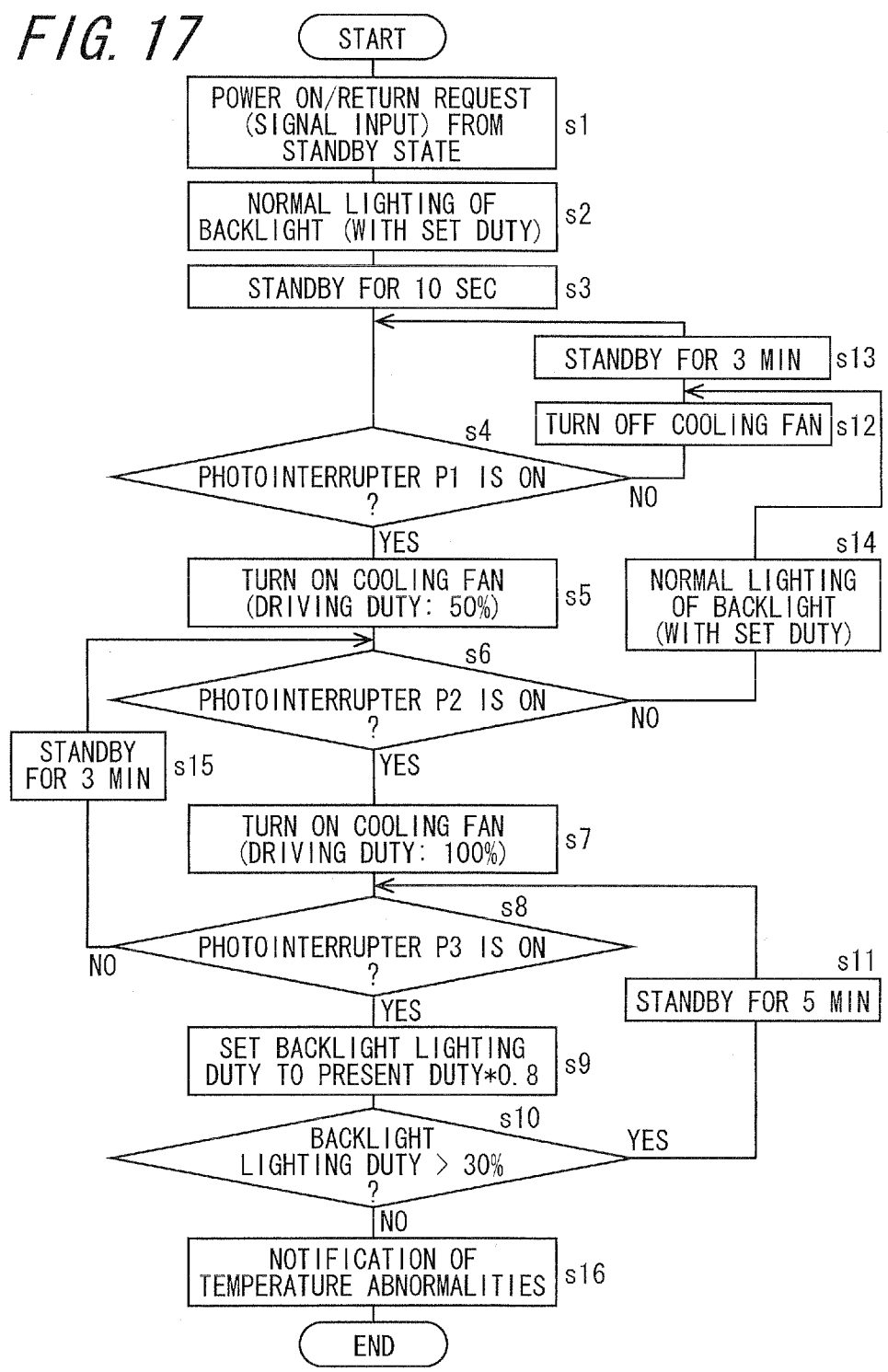
FIG. 17 is a flowchart of a driving control in the liquid crystal display apparatus according to the eighth embodiment of the technology.

FIG. 17 is a flowchart of a driving control in the liquid crystal display apparatus 100 according to the eighth embodiment of the technology. In this control flow, it is assumed that the liquid crystal display apparatus 100 is always used in the operating state. It is also assumed that the liquid crystal display apparatus 100 will not be powered off except for the case where temperature abnormalities occur in the liquid crystal display apparatus 100 and the control thereof stops.

In step s1, it is monitored whether there is a power ON request or a return request (signal input) from a standby state (power-saving mode or screen-saver mode). In step s2, the light sources 122 are normally lit with a preset duty ratio. In step s3, standby is performed for a predetermined period, for example, 10 seconds.

In step s4, it is determined whether or not the displacement member 71 was detected by the photointerrupter P1. When the displacement member 71 is detected, the flow proceeds to step s5, and if not, the flow proceeds to step s12. In step s5, the cooling fan 60 is driven at a duty ratio of 50%. In step s6, it is determined whether or not the displacement member 71 is detected by the photointerrupter P2. When the displacement member 71 is detected, the flow proceeds to step s7, and if not, the flow proceeds to step s14.

In step s7, the cooling fan 60 is driven at a duty ratio of 100%. In step s8, it is determined whether or not the displacement member 71 is detected by the photointerrupter P3. When the displacement member 71 is detected, the flow proceeds to step s9, and if not, the flow proceeds to step s15.

In step s9, the duty ratio of the light sources 122 is reset to 80% of the present duty ratio. In step s10, it is determined whether or not the reset duty ratio of the light sources 122 exceeds 30% of the full duty ratio.

When the reset duty ratio exceeds 30% of the full duty ratio, the flow proceeds to step s11, and if not, the flow proceeds to step s16.

In step s11, standby is performed for a predetermined period, for example, 5 minutes. Then, the flow proceeds to step s8. In step s12, the driving of the cooling fan 60 is stopped. In step s13, standby is performed for a predetermined period, for example, 3 minutes. Then, the flow proceeds to step s4.

In step s14, the light sources 122 are normally lit with the preset duty ratio. Then, the flow proceeds to step s13. In step s15, standby is performed for a predetermined period, for example 3 minutes. Then, the flow proceeds to step s6. In step s16, it is determined that temperature abnormalities have occurred in the liquid crystal display apparatus 100, and a notification/alarm of temperature abnormalities is outputted, and then the control of the liquid crystal display apparatus 100 stops.

As described above, according to this embodiment, the driving of the cooling fan 60 is controlled by detecting the amount of displacement of the diffuser plate 131, namely the amount of bending towards the back side. Therefore, it is possible to efficiently prevent deterioration of the image quality due to the temperature rise in the liquid crystal display apparatus 100 and to decrease noise resulting from the driving of the cooling fan 60 as much as possible, thus creating a quiet condition.

Moreover, the amount of bending of the diffuser plate 131 is efficiently detected by the first and second protruding members 51 and 52 and the deformation amount detection element 70 from an initial stage where the amount of bending of the diffuser plate 131 towards the back side is relatively small. Therefore, it is possible to control the driving of the cooling fan 60 and the lighting of the light sources 122 on a safe side where image quality deterioration resulting from a temperature rise in the liquid crystal display apparatus 100 has not occurred or progressed.

(Ninth Embodiment)

Figure 18:
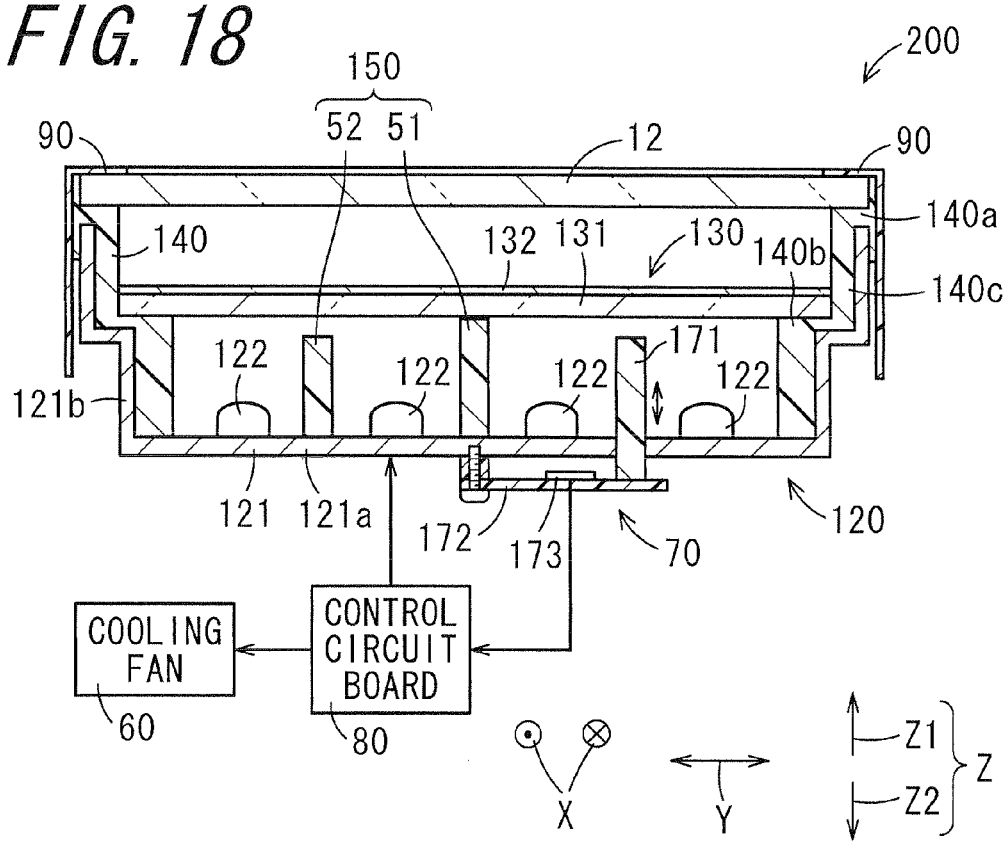
FIG. 18 is a cross-sectional view showing a schematic configuration of a liquid crystal display apparatus according to a ninth embodiment of the technology.

FIG. 18 is a cross-sectional view showing a schematic configuration of a liquid crystal display apparatus 200 according to a ninth embodiment of the technology. The liquid crystal display apparatus 200 of this embodiment has approximately the same configuration as the liquid crystal display apparatus 100 of the eighth embodiment except for the configuration of the deformation amount detection element 70. Thus, the corresponding portions will be denoted by the same reference numerals, and redundant description thereof will be omitted.

The deformation amount detection element 70 is configured to detect the deformation amount of the optical member 130. In this embodiment, the deformation amount detection element 70 is configured to detect the amount of bending of the optical member 130 towards the back side and is provided in the vicinity of the position where the second protruding members 52 are erected. In this way, by using the deformation amount detection element 70, it is possible to detect the amount of bending of the diffuser plate 131 at the initial stage where the amount of bending of the diffuser plate 131 towards the back side is relatively small.

Specifically, the deformation amount detection element 70 has a displacement member 171 which is supported at an initial position on the back side of the optical member 130 separated by a predetermined distance from the optical member 130 at room temperature supported by the supporting portion 140b and which is provided so as to be displaceable in a direction towards or away from the optical member 130, namely in the depth direction Z, a deformation member 172 which is deformed by being bent in accordance with the amount of displacement of the displacement member 171 from the initial position, and a strain detection section 173 that detects the amount of strain of the deformation member 172 resulting from the bending deformation.

The displacement member 171 is formed in an approximately rod shape and is formed of the same material as the first and second protruding members 51 and 52, for example. The displacement member 171 is inserted through a through-hole formed on the bottom plate 121a of the backlight chassis 121, and a detection-side end disposed on the back side of the bottom plate 121a is fixed to a free end of the deformation member 172 which is supported in a cantilever-like manner on the back side of the bottom plate 121a.

The deformation member 172 is a plate-shaped member and is configured such that a base end which is one end in the longitudinal direction thereof is fixed to the outer surface of the bottom plate 121a by a fastening such as a screw, the detection-side end of the displacement member 171 is fixed to the free end which is the other end in the longitudinal direction, and the free end is displaceable from the base end in the direction Z2. The deformation member 172 supports the displacement member 171 so that the displacement member 171 maintains its initial position.

The initial position is determined to be a position such that the tip end of the contact-side end of the displacement member 171 disposed on the front side of the bottom plate 121a is disposed on the front side with respect to the tip ends of the second protruding members 52. For example, the initial position is determined to be a position such that the tip end of the contact-side end is disposed at the same height position as the tip ends of the first protruding members 51.

The strain detection section 173 is configured by a strain gauge capable of detecting the amount of strain of the deformation member 172 resulting from the bending deformation. The strain detection section 173 is attached between the base end and the free end of the deformation member 172. The strain detection section 173 is configured to detect the amount of displacement of the displacement member 171 from the initial position in a continuous manner. The strain detection section 173 outputs the detection results to the control circuit board 80.

Figure 19:
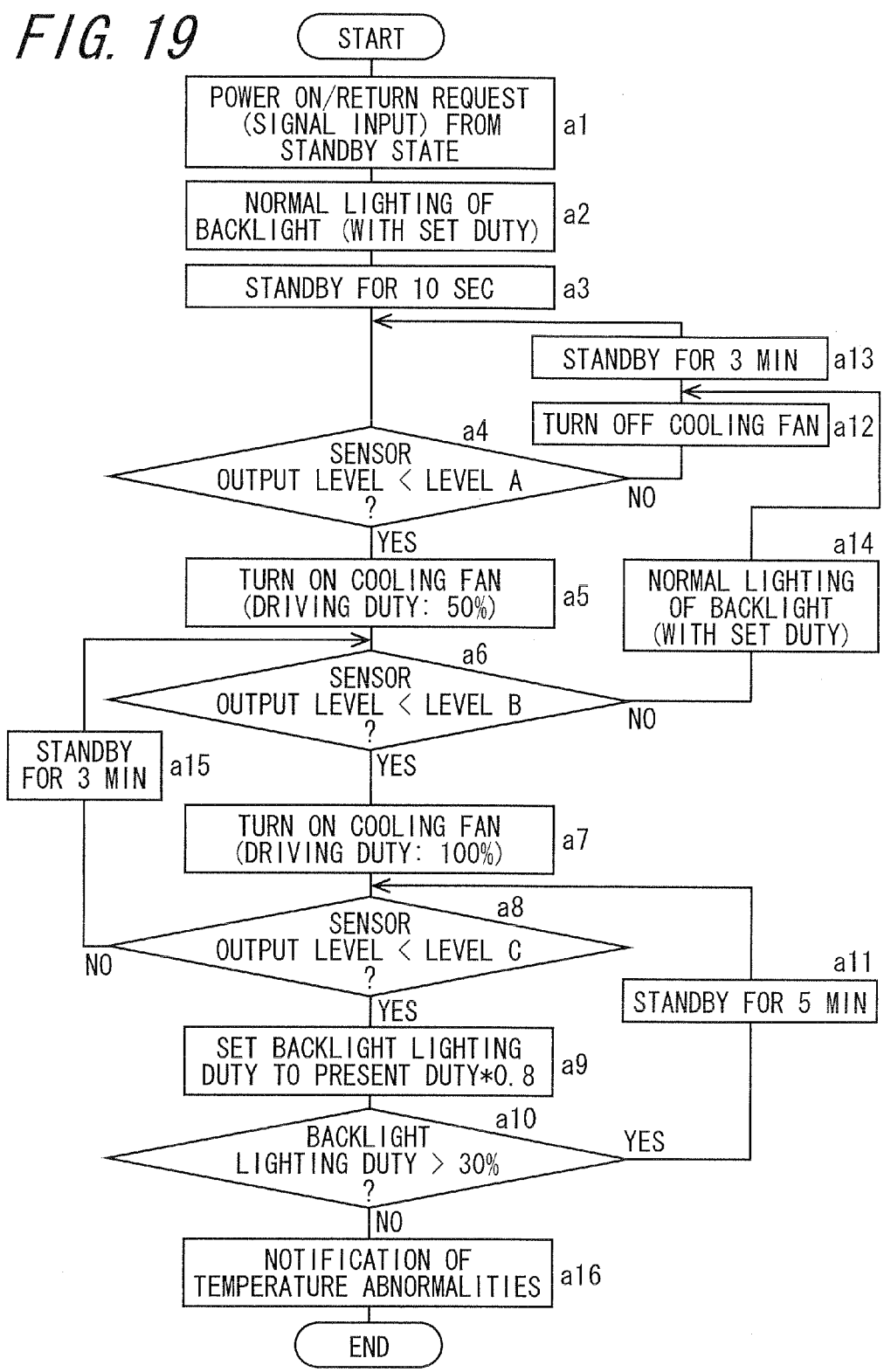
FIG. 19 is a flowchart of a driving control in the liquid crystal display apparatus according to the ninth embodiment of the technology.

FIG. 19 is a flowchart of a driving control in the liquid crystal display apparatus 200 according to the ninth embodiment of the technology. In this control flow, it is assumed that the liquid crystal display apparatus 200 is always used in the operating state. It is also assumed that the liquid crystal display apparatus 200 will not be powered off except the case where temperature abnormalities occur in the liquid crystal display apparatus 200 and the control thereof stops. As described above, although the amount of displacement itself of the displacement member 171 is detected in a continuous manner, the reference (the threshold value for controlling the liquid crystal display apparatus 200) for determining the output level is set in three steps of levels A to C, for example.

In step a1, it is monitored whether there is a power ON request or a return request (signal input) from a standby state (power-saving mode or screen-saver mode). In step a2, the light sources 122 are normally lit with a preset duty ratio. In step a3, standby is performed for a predetermined period, for example, 10 seconds.

In step a4, it is determined whether or not the output level from the strain detection section 173 is smaller than the level A. If the output level is smaller than the level A, the flow proceeds to step a5, and if not, the flow proceeds to step a12. In step a5, the cooling fan 60 is driven at a duty ratio of 50%. In step a6, it is determined whether or not the output level from the strain detection section 173 is smaller than the level B. If the output level is smaller than the level B, the flow proceeds to step a7, and if not, the flow proceeds to step a14.

In step a7, the cooling fan 60 is driven at a duty ratio of 100%. In step s8, it is determined whether or not the output level from the strain detection section 173 is smaller than the level C. If the output level is smaller than the level C, the flow proceeds to step a9, and if not, the flow proceeds to step a15.

In step a9, the duty ratio of the light sources 122 is reset to 80% of the present duty ratio. In step a10, it is determined whether or not the reset duty ratio of the light sources 122 exceeds 30% of the full duty ratio. When the reset duty ratio exceeds 30% of the full duty ratio, the flow proceeds to step a11, and if not, the flow proceeds to step a16.

In step a11, standby is performed for a predetermined period, for example, 5 minutes. Then, the flow proceeds to step a8. In step a12, the driving of the cooling fan 60 is stopped. In step a13, standby is performed for a predetermined period, for example, 3 minutes. Then, the flow proceeds to step a4.

In step a14, the light sources 122 are normally lit with the preset duty ratio. Then, the flow proceeds to step a13. In step a15, standby is performed for a predetermined period, for example 3 minutes. Then, the flow proceeds to step a6. In step a16, it is determined that temperature abnormalities have occurred in the liquid crystal display apparatus 200, and a notification/alarm of temperature abnormalities is outputted, and then the control of the liquid crystal display apparatus 200 stops.

As described above, according to this embodiment, the driving of the cooling fan 60 is controlled by detecting the amount of displacement of the diffuser plate 131, namely the amount of bending towards the back side. Therefore, it is possible to efficiently prevent deterioration of the image quality due to the temperature rise in the liquid crystal display apparatus 200 and to decrease noise resulting from the driving of the cooling fan 60 as much as possible, thus creating a quiet condition.

Moreover, the amount of bending of the diffuser plate 131 is efficiently detected by the first and second protruding members 51 and 52 and the deformation amount detection element 70 from an initial stage where the amount of bending of the diffuser plate 131 towards the back side is relatively small. Therefore, it is possible to control the driving of the cooling fan 60 and the lighting of the light sources 122 on a safe side where image quality deterioration resulting from a temperature rise in the liquid crystal display apparatus 200 has not occurred or progressed.

(Tenth Embodiment)

Figure 20:
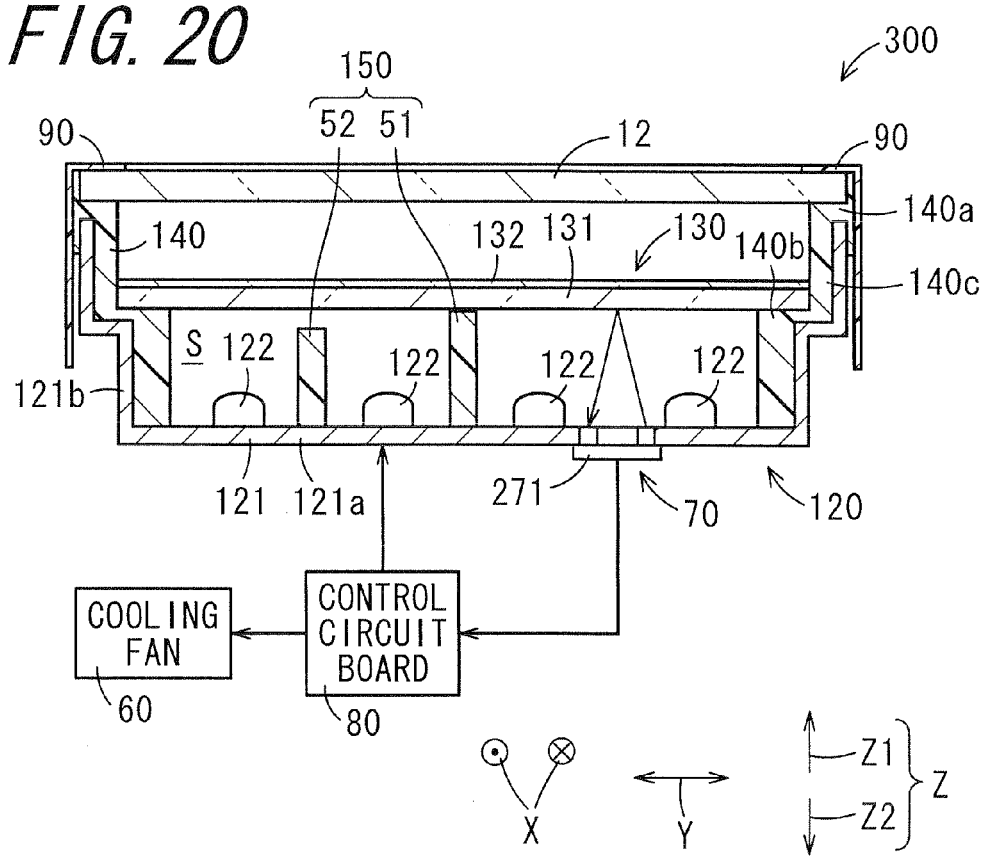
FIG. 20 is a cross-sectional view showing a schematic configuration of a liquid crystal display apparatus according to a tenth embodiment of the technology.

FIG. 20 is a cross-sectional view showing a schematic configuration of a liquid crystal display apparatus 300 according to a tenth embodiment of the technology. The liquid crystal display apparatus 300 of this embodiment has approximately the same configuration as the liquid crystal display apparatus 100 of the eighth embodiment except for the configuration of the deformation amount detection element 70. Thus, the corresponding portions will be denoted by the same reference numerals, and redundant description thereof will be omitted.

The deformation amount detection element 70 is configured to detect the deformation amount of the optical member 130. In this embodiment, the deformation amount detection element 70 is configured to detect the amount of bending of the optical member 130 towards the back side in a non-contacting manner and is provided in the vicinity of the position where the second protruding members 52 are erected. In this way, by using the deformation amount detection element 70, it is possible to detect the amount of bending of the diffuser plate 131 at the initial stage where the amount of bending of the diffuser plate 131 towards the back side is relatively small.

The deformation amount detection element 70 has a distance measurement section 271 which is provided on the back side of the optical member 130 so as to be fixed to the bottom plate 121a separated from the optical member 130. The distance measurement section 271 includes a light emitting element and a light receiving element and is configured to detect the distance to the optical member 130 in a non-contacting manner. The distance measurement section 271 is able to detect the amount of bending of the optical member 130 towards the back side in a continuous manner by measuring the distance to the optical member 130. The distance measurement section 271 outputs the detection results to the control circuit board 80. In this embodiment, the driving control is performed in accordance with the control flow shown in FIG. 19.

As described above, according to this embodiment, the driving of the cooling fan 60 is controlled by detecting the amount of displacement of the diffuser plate 131, namely the amount of bending towards the back side. Therefore, it is possible to efficiently prevent deterioration of the image quality due to the temperature rise in the liquid crystal display apparatus 300 and to decrease noise resulting from the driving of the cooling fan 60 as much as possible, thus creating a quiet condition.

Moreover, the amount of bending of the diffuser plate 131 is efficiently detected by the first and second protruding members 51 and 52 and the deformation amount detection element 70 from an initial stage where the amount of bending of the diffuser plate 131 towards the back side is relatively small. Therefore, it is possible to control the driving of the cooling fan 60 and the lighting of the light sources 122 on a safe side where image quality deterioration resulting from a temperature rise in the liquid crystal display apparatus 200 has not occurred or progressed.

Moreover, since the amount of bending of the diffuser plate 131 towards the back side can be detected in a non-contacting manner, it is possible to simplify the configuration of the device.

(Eleventh Embodiment)

Figure 21:
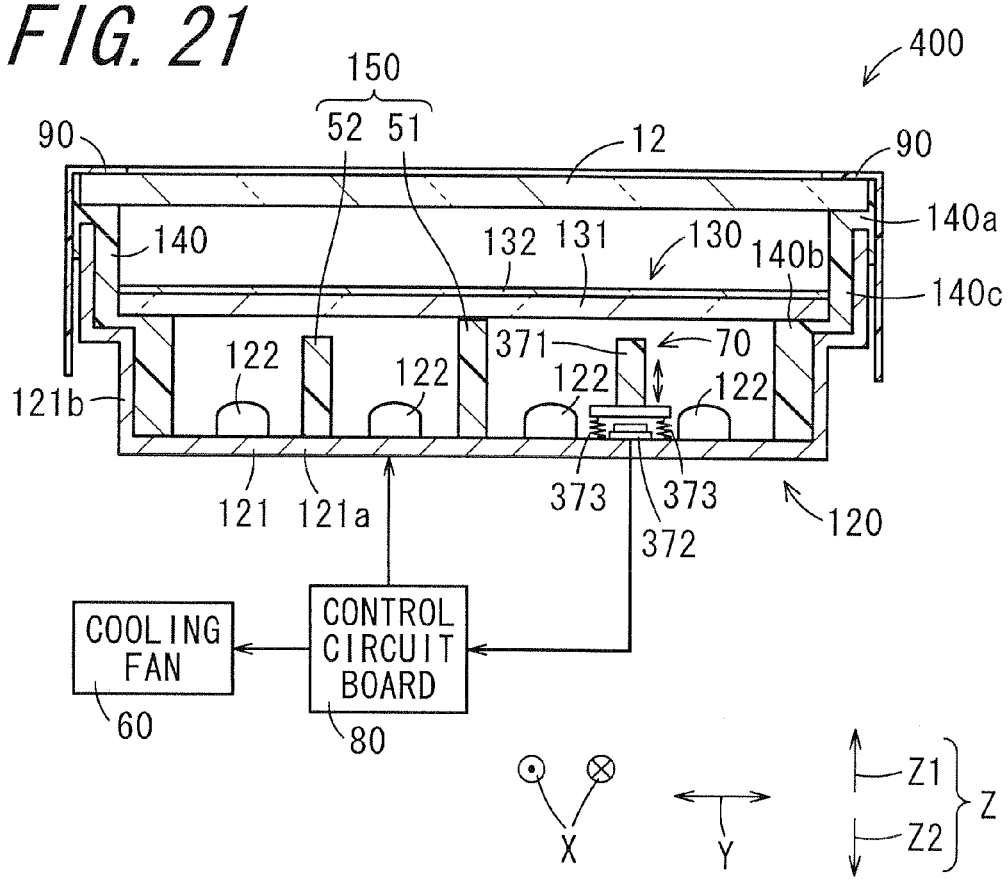
FIG. 21 is a cross-sectional view showing a schematic configuration of a liquid crystal display apparatus according to an eleventh embodiment of the technology.

FIG. 21 is a cross-sectional view showing a schematic configuration of the liquid crystal display apparatus 400 according to an eleventh embodiment of the technology. The liquid crystal display apparatus 400 of this embodiment has approximately the same configuration as the liquid crystal display apparatus 100 of the eighth embodiment except for the configuration of the deformation amount detection element 70. Thus, the corresponding portions will be denoted by the same reference numerals, and redundant description thereof will be omitted.

The deformation amount detection element 70 is configured to detect the deformation amount of the optical member 130. In this embodiment, the deformation amount detection element 70 is configured to detect the amount of bending of the optical member 130 towards the back side and is provided in the vicinity of the position where the second protruding members 52 are erected.

Specifically, the deformation amount detection element 70 has a displacement member 371 which is supported at an initial position on the back side of the optical member 130 separated by a predetermined distance from the optical member 130 at room temperature supported by the supporting portion 140b and which is provided so as to be displaceable in a direction towards or away from the optical member 130, namely in the depth direction Z, a displacement amount detection section 372 that detects the amount of displacement of the displacement member 371 in the direction Z2 from the initial position, and a compression coil spring 373 that biases the displacement member 371 in the direction towards the optical member 130, namely the direction Z1.

The displacement member 371 is formed in an approximately rod shape and is formed of the same material as the first and second protruding members 51 and 52, for example. The displacement member 371 is configured such that the compression coil spring 373 is attached between the bottom plate 121a of the backlight chassis 121 and a detection-side end of the displacement member 371 which is an end disposed closer to the back side so as to bias the displacement member 371 in the direction Z1. The compression coil spring 373 supports the displacement member 371 so that the displacement member 371 maintains its initial position.

The initial position is determined to be a position such that the tip end of the contact-side end of the displacement member 371 which is an end disposed on the front side is disposed on the front side with respect to the tip ends of the second protruding members 52. For example, the initial position is determined to be a position such that the tip end of the contact-side end is disposed at the same height position as the tip ends of the first protruding members 51.

The displacement amount detection section 372 is configured to include a switch element capable of switching between a conduction state and a cut-off state in accordance with the displacement of the displacement member 371. The switch element is realized by a tactile switch. Therefore, when the displacement member 371 is displaced by a predetermined amount of displacement in the direction Z2, an operation portion provided in the switch element is pressed, so that the displacement amount detection section 372 is switched between the conduction state and the cut-off state. The displacement amount detection section 372 outputs a signal which represents the state of the switch element to the control circuit board 80.

FIG. 22 is a flowchart of a driving control in the liquid crystal display apparatus 400 according to the eleventh embodiment of the technology. In this control flow, it is assumed that the liquid crystal display apparatus 400 is always used in the operating state. It is also assumed that the liquid crystal display apparatus 400 will not be powered off except for the case where temperature abnormalities occur in the liquid crystal display apparatus 400 and the control thereof stops.

In step b1, it is monitored whether there is a power ON request or a return request (signal input) from a standby state (power-saving mode or screen-saver mode). In step b2, the light sources 122 are normally lit with a preset duty ratio. In step b3, standby is performed for a predetermined period, for example, 10 seconds.

In step b4, it is determined whether or not the tactile switch is in the conduction state. When the switch is in the conduction state, the flow proceeds to step b5, and if not, the flow proceeds to step b6. In step b5, the cooling fan 60 is driven, and the flow proceeds to step b7. In step b6, the driving of the cooling fan 60 stops. In step b7, standby is performed for a predetermined period, for example, 3 minutes. Then, the flow proceeds to step s4.

As described above, according to this embodiment, the driving of the cooling fan 60 is controlled by detecting the amount of displacement of the diffuser plate 131, namely the amount of bending towards the back side. Therefore, it is possible to efficiently prevent deterioration of the image quality due to the temperature rise in the liquid crystal display apparatus 400 and to decrease noise resulting from the driving of the cooling fan 60 as much as possible, thus creating a quiet condition.

(Twelfth Embodiment)

FIG. 23 is a cross-sectional view showing a schematic configuration of a liquid crystal display apparatus 500 according to a twelfth embodiment of the technology. The liquid crystal display apparatus 500 of this embodiment has approximately the same configuration as the liquid crystal display apparatus 100 of the eighth embodiment except for the configuration of the deformation amount detection element 70. Thus, the corresponding portions will be denoted by the same reference numerals, and redundant description thereof will be omitted.

The deformation amount detection element 70 is configured to detect the deformation amount of the optical member 130. In this embodiment, the deformation amount detection element 70 is configured to detect the amount of extension of the optical member 130 in the planar direction and is provided outwardly in the planar direction of the optical member 130. Specifically, the deformation amount detection element 70 is disposed so as to detect the amount of extension of the optical member 130 in the long-side direction.

Specifically, the deformation amount detection element 70 has a displacement amount detection section 471 that detects the amount of extension of the optical member 130 in the planar direction. The displacement amount detection section 471 is configured to include a switch element capable of switching between a conduction state and a cut-off state in accordance with the extension of the optical member 130 in the planar direction. The switch element is realized by a tactile switch. Therefore, when the optical member 130 is extended by a predetermined amount of extension in the long-side direction, an operation portion provided in the switch element is pressed, so that the displacement amount detection section 471 is switched between the conduction state and the cut-off state. The displacement amount detection section 471 outputs a signal which represents the state of the switch element to the control circuit board 80. In this embodiment, the driving control is performed in accordance with the control flow shown in FIG. 22.

As described above, according to this embodiment, the driving of the cooling fan 60 is controlled by detecting the amount of displacement of the diffuser plate 131, namely the amount of extension in the planar direction. Therefore, it is possible to efficiently prevent deterioration of the image quality due to the temperature rise in the liquid crystal display apparatus 500 and to decrease noise resulting from the driving of the cooling fan 60 as much as possible, thus creating a quiet condition.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. An image display apparatus comprising:
    a liquid crystal panel having liquid crystal elements, for displaying an image on one surface thereof using the liquid crystal elements, the liquid crystal panel being formed in rectangular form;
    a chassis disposed on a side of another surface of the liquid crystal panel;
    a planar member disposed between the liquid crystal panel and the chassis so as to be approximately in parallel to the liquid crystal panel, the planar member being a diffuser plate or a reinforcing plate; and
    a protruding portion fixed to the chassis and protruding towards the planar member, the protruding portion including:
        a plurality of first protruding members disposed so as to be separated by a first distance from the liquid crystal panel, the plurality of first protruding members defining a small allowance region for the planar member in which an amount of displacement of the planar member towards the chassis side is regulated at most to a first predetermined value; and
        a plurality of second protruding members disposed so as to be separated by a second distance which is larger than the first distance, from the liquid crystal panel, the plurality of second protruding members defining a large allowance region for the planar member in which an amount of displacement towards the chassis side is regulated at most to a second predetermined value which is larger than a first predetermined value, wherein the plurality of first protruding members have a first height from an inner surface of the chassis and the plurality of second protruding members have a second height from the inner surface, the first height being higher than the second height, and wherein the plurality of first protruding members and the plurality of second protruding members are alternately arranged throughout in a long-side direction of the liquid crystal panel or a short-side direction of the liquid crystal panel.

2. The image display apparatus of claim 1, wherein at least the plurality of second protruding members of the protruding portion are provided so as to be separated from the planar member at room temperature, and the plurality of first and second protruding members regulate the amount of displacement towards the chassis side when the temperature of the planar member reaches a temperature higher than room temperature.

3. The image display apparatus of claim 2, wherein the large allowance region is defined at different positions which are separated on opposite sides to each other with respect to a center of the planar member.

4. The image display apparatus of claim 1, wherein a plurality of large and small allowance regions are defined in the long-side direction of the liquid crystal panel and the short-side direction of the liquid crystal panel.

5. The image display apparatus of claim 1, wherein the large allowance region is defined in an annular form with respect to the center of the planar member.

6. The image display apparatus of claim 1, wherein a notch is formed in a part of the small allowance region in an outer peripheral portion of the planar member or in a part of the outer peripheral portion in a vicinity of the small allowance region.

7. The image display apparatus of claim 1, wherein a convex portion protruding outwardly in a planar direction of the planar member is formed in a part of the small allowance region in an outer peripheral portion of the planar member or a part of the outer peripheral portion in a vicinity of the small allowance region, and the image display apparatus further comprises a spacer disposed between the convex portion and the liquid crystal panel.

8. The image display apparatus of claim 1, wherein a minimum value of a thickness dimension of the planar member in the small allowance region is set to be smaller than a thickness dimension of the planar member in the large allowance region.

9. The image display apparatus of claim 1, wherein the large allowance regions are defined in a plurality of lines in the short-side direction of the liquid crystal panel.

* * * * *